US012374201B2

(12) United States Patent
Zhang

(10) Patent No.: US 12,374,201 B2
(45) Date of Patent: Jul. 29, 2025

(54) ADJUSTABLE CURVED SURFACE SECURITY DEVICE

(71) Applicant: Edge Security Products, LLC, Waxhaw, NC (US)

(72) Inventor: Ningsheng Zhang, Waxhaw, NC (US)

(73) Assignee: EDGE SECURITY PRODUCTS, LLC, Waxhaw, NC (US)

( * ) Notice: Subject to any disclaimer, the term of this patent is extended or adjusted under 35 U.S.C. 154(b) by 0 days.

(21) Appl. No.: 18/241,556

(22) Filed: Sep. 1, 2023

(65) Prior Publication Data

US 2024/0078883 A1 Mar. 7, 2024

Related U.S. Application Data

(60) Provisional application No. 63/446,389, filed on Feb. 17, 2023, provisional application No. 63/402,982, filed on Sep. 1, 2022.

(51) Int. Cl.
*G08B 13/14* (2006.01)
*G08B 13/24* (2006.01)

(52) U.S. Cl.
CPC ..... *G08B 13/1463* (2013.01); *G08B 13/2434* (2013.01)

(58) Field of Classification Search
CPC .......... G06K 19/07758; G08B 13/1463; G08B 13/2434
See application file for complete search history.

(56) References Cited

U.S. PATENT DOCUMENTS

| | | | | |
|---|---|---|---|---|
| 5,245,317 A | | 9/1993 | Chidley et al. | |
| 5,574,430 A | * | 11/1996 | Ott | G08B 13/1463 340/568.4 |
| 5,886,633 A | * | 3/1999 | Adams | G08B 13/1463 340/687 |
| 6,215,400 B1 | * | 4/2001 | Rand | G08B 13/1463 340/568.8 |
| 6,727,817 B2 | | 4/2004 | Maloney | |
| 7,259,674 B2 | * | 8/2007 | Marsilio | G08B 13/2434 215/279 |
| 7,474,209 B2 | | 1/2009 | Marsilio et al. | |
| 7,598,861 B2 | | 10/2009 | Belden, Jr. et al. | |
| 7,659,816 B2 | | 2/2010 | Wandel | |
| 7,737,845 B2 | | 6/2010 | Fawcett et al. | |
| 7,737,846 B2 | | 6/2010 | Belden, Jr. et al. | |
| 7,847,692 B2 | | 12/2010 | Schuller | |
| 7,871,009 B1 | * | 1/2011 | Blonigen | B65C 9/1884 235/487 |
| 7,916,020 B2 | | 3/2011 | Seidel | |
| 7,961,099 B2 | | 6/2011 | Rendon et al. | |

(Continued)

*Primary Examiner* — John A Tweel, Jr.

(74) *Attorney, Agent, or Firm* — BURR & FORMAN LLP

(57) ABSTRACT

A security device may include a housing and a wireless signal generator. The housing may include an engagement assembly configured to be operably coupled to a curved surface of a product. The wireless signal generator may be disposed within the housing, and the wireless signal generator may be configured to output a wireless signal for detection by theft deterrence equipment. The engagement assembly may include a curved base and a plurality of flexible wings. The plurality of flexible wings may be configured to provide an adjustable coupling surface that flexes to conform to surfaces of products having different curvatures.

18 Claims, 21 Drawing Sheets

(56) References Cited

U.S. PATENT DOCUMENTS 8,284,062 B2 10/2012 Wyatt, Jr. et al.
8,319,652 B2 11/2012 Oh et al.
8,344,891 B2 1/2013 Appalucci et al.
8,347,663 B2 1/2013 Fawcett et al.
8,451,128 B2 5/2013 Yang
8,525,675 B2 * 9/2013 Zhang ................. E05B 73/0041
340/568.1
8,547,228 B2 10/2013 Brodzik et al.
8,547,229 B2 10/2013 Brodzik et al.
8,581,726 B2 11/2013 Piccoli et al.
8,704,665 B2 4/2014 Yang
8,752,406 B2 6/2014 Shute et al.
8,833,116 B1 9/2014 Brown
9,135,800 B2 9/2015 Fawcett et al.
9,169,670 B2 10/2015 Shute et al.
9,336,665 B2 5/2016 Yang
9,495,856 B2 8/2016 Brenner
9,567,776 B2 2/2017 Moock et al.
9,607,259 B2 * 3/2017 Norman ................. B65D 23/14
9,767,662 B2 9/2017 Lax et al.
10,181,243 B1 * 1/2019 Piccoli ................ E05B 73/0041
10,643,117 B2 * 5/2020 Nooner .............. G06K 19/0723
11,037,421 B2 * 6/2021 Zhang ................. E05B 73/0029
11,250,677 B2 2/2022 Zhang et al.
11,727,773 B2 8/2023 Ewing et al.
11,756,393 B2 9/2023 Zhang et al.
11,798,386 B2 * 10/2023 Sandoval ............. G08B 13/149
12,000,178 B2 * 6/2024 Eden ................... E05B 73/0017
2005/0200485 A1 9/2005 Connolly et al.
2006/0145848 A1 7/2006 Marsilio et al.
2007/0131005 A1 6/2007 Clare
2008/0100457 A1 5/2008 Gray
2011/0121973 A1 5/2011 Yang
2012/0187003 A1 7/2012 Stewart et al.
2016/0005279 A1 1/2016 Salvo
2017/0193771 A1 7/2017 Will et al.
2020/0117971 A1 * 4/2020 Komori .................. G06K 19/02
2022/0406156 A1 12/2022 Napthine

* cited by examiner

ADJUSTABLE CURVED SURFACE SECURITY DEVICE

CROSS REFERENCE TO RELATED APPLICATIONS

This application claims the benefit of U.S. Provisional Application No. 63/402,982, filed Sep. 1, 2022 and 63/446,389 filed Feb. 17, 2023, the contents of both being incorporated by reference herein in their entirety.

TECHNICAL FIELD

Example embodiments generally relate to security technology and, in particular, relate to security devices that can be attached to an item or product to provide, for example, theft security and deterrence.

BACKGROUND

In retail settings, product security tags and other devices are attached to products or product packaging to deter and intercept theft activities. Such devices operate by notifying retailers that a theft event may be occurring. Theft deterrent equipment and systems, often in the form of electronic article surveillance (EAS) systems, use pedestals or towers that operate as a gate (i.e., an EAS gate) located at the exits of a retail establishment. The pedestals or towers include antennas for detecting RF signals emitted by a product security device that is affixed to a product for sale. Such an EAS gate may sound an alarm in response to receipt of the RF signals to indicate that a possible theft is occurring. Other solutions include local, tamper alarming features. Despite the evolution of solutions in this space, there continues to be a need for improvement in the area of product security devices.

SUMMARY OF SOME EXAMPLE EMBODIMENTS

According to some example embodiments, a security device may comprise a housing and a wireless signal generator. The housing may comprise an engagement assembly configured to be operably coupled to a curved surface of a product. The wireless signal generator may be disposed within the housing, and the wireless signal generator may be configured to output a wireless signal for detection by theft deterrence equipment. The engagement assembly may comprise a curved base and a plurality of flexible wings. The plurality of flexible wings may be configured to provide an adjustable coupling surface that flexes to conform to surfaces of products having different curvatures.

According to some example embodiments, the security device may comprise a housing, a plunger switch, a sounder, and processing circuitry. The housing may comprise an engagement assembly configured to be operably coupled to a curved surface of a product. The engagement assembly may comprise a curved base and a plurality of flexible wings. The plunger switch may comprise a plunger. The plunger switch may provide an electrical output in response to the plunger being in a depressed position or an extended position. The plunger may be configured to contact the curved surface of the product when the security device is affixed to the product. The sounder may be configured to controllably output an audible alarm sound. The processing circuitry may be configured to cause the sounder to emit the audible alarm sound in response to the electrical output from the plunger switch indicating that the plunger has moved from the depressed position to the extended position. The plurality of flexible wings may be configured to provide an adjustable coupling surface that flexes to conform to surfaces of products having different curvatures.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1A:
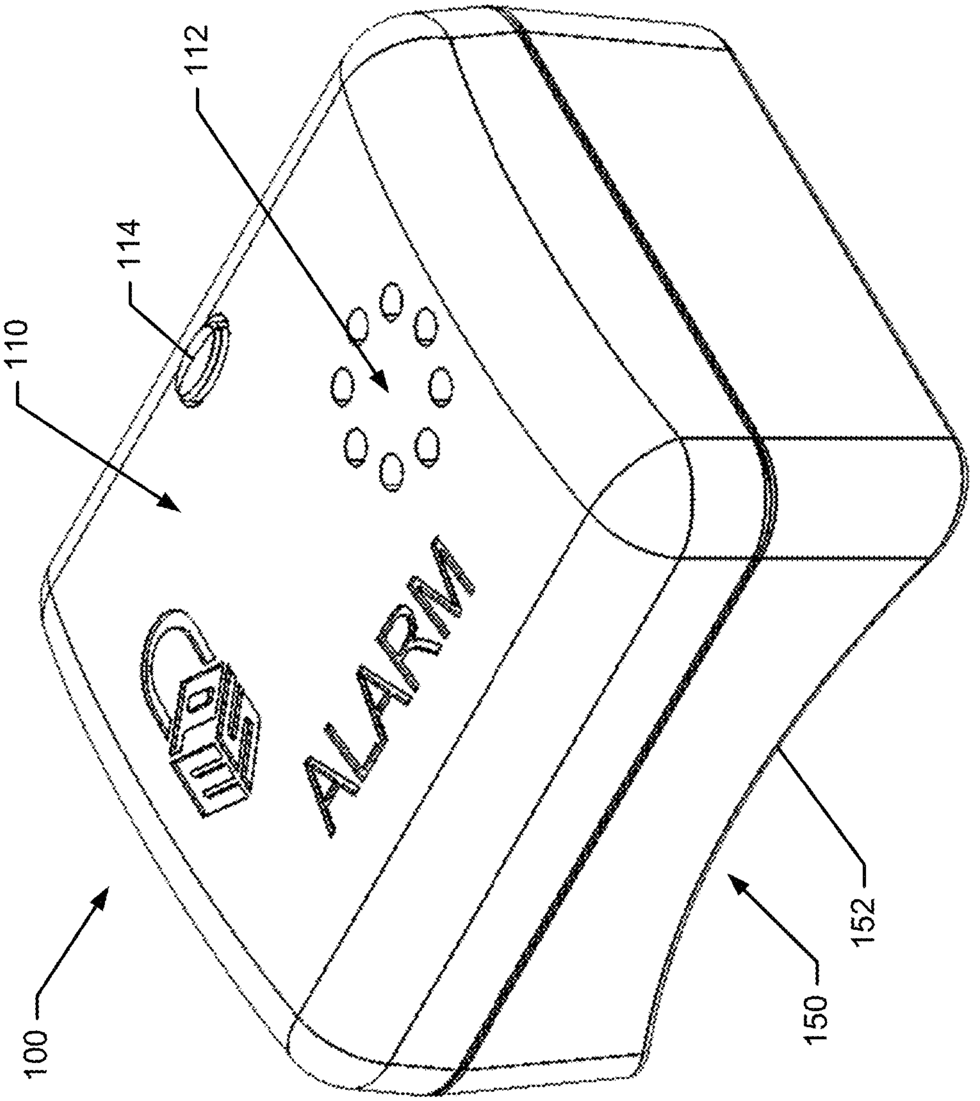
FIG. 1A illustrates a security device according to some example embodiments.

Some example embodiments will now be described more fully hereinafter with reference to the accompanying drawings, in which some, but not all example embodiments are shown therein. Indeed, the examples described and pictured herein should not be construed as being limiting as to the scope, applicability, or configuration of the present disclosure. Rather, these embodiments are provided as example implementations so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other. The term “or” as provided herein is used in the logical manner such that the truth of one or more elements within an “or” statement renders the statement true. Additionally, it is understood that reference to the surface of a product is inclusive of the surface of product packaging for a product that may be disposed within the product packaging.

Following from the above, one challenge in the retail theft deterrence space is that conventional security devices, sometimes referred to as security tags, do not support application to products or product packaging that have rounded or curved surfaces. As a result, such products are left unprotected and are therefore more susceptible to theft. In recent years, insulated cups and flasks have become popular, and rather expensive, making such items targets of theft. However, because of their curved exterior surfaces, affixing a security device to such products is problematic. Some conventional solutions may include a corresponding curved surface, but such solutions are limited by only being able to be securely applied to matched concave and convex curved surfaces (e.g., surfaces having a corresponding radius of curvature).

According to some example embodiments, a security device is provided that supports secure application to products that have rounded or curved surfaces, where the engaging surface of the security device is adjustable to support secure application to surfaces of different products that have different curvatures. According to some example embodiments, the security device may comprise an engaging assembly that creates an adjustable coupling surface to support application to a variety of products having differing curved surfaces.

To do so, according to some example embodiments, the engaging assembly may include two or more flexible wings. The flexible wings may extend from a curved base of the security device, and, according to some example embodiments, the curved base and the flexible wings may be components of the engaging assembly for the security device. In this regard, according to some example embodiments, the engaging assembly may be, for example, integrated with the housing of the security device. The flexible wings may extend from a base portion or the curved base, and the flexible wings may have different curvature than the curved base. The flexibility of the wings may provide for the adjustability of the engaging assembly to conform to different curvatures. In this regard, the flexible wings may extend away in a curved or arcuate manner from the curved base or a portion of a base with a higher degree of curvature (e.g., a smaller radius of the curvature) than the curvature of the curved base. As such, the engaging assembly may be configured to facilitate affixing the security device to surfaces with a range of curvatures between the curvature of the undeflected or unflexed wings and the curvature of the curved base. Because the wings are flexible, surfaces having curvatures in the middle of this range may also be engaged by deflecting or flexing the wings. According to some example embodiments, a two-sided adhesive pad may be disposed between the wings and the curved surface of the product, and the adhesive properties of the adhesive pad may not only operate to affix the wings to the curved surface of the product, but also maintain the wings in a flexed position when deflection of the wings is necessary to conform to the curved surface of the product.

Additionally, according to some example embodiments, the security device may be affixed to a product to provide a security feature within a retail store environment. The security device may be, for example, a battery-powered device that includes local and remote alarming capabilities to inform store personnel that a theft event may be occurring. In this regard, if an armed security device that is affixed to a product is removed and separated from the product, a local alarm on the security device may be triggered to inform store personnel of a tamper event. Further, if the still-affixed and armed security device is detected by theft deterrence equipment, for example, due to passing through an EAS gate at the ingress or egress of the retail store, then a wireless signal generator, such as a resonator within the security device, may output a signal that causes the theft deterrent equipment to sound a remote alarm (e.g., via a siren or sounder at the ingress or egress) indicating that a possible theft of the affixed product is occurring.

According to some example embodiments, to deactivate the security device in association with a purchase of the affixed product, a device in form of a deactivator (e.g., an EAS deactivator), often located at or near the point of sale (POS), may be used. In this regard, the security device may be configured to detect a deactivation field output by the deactivator and, in response to detecting the deactivator field, the security device may be configured to transition into a disarmed state from an armed state. In the disarmed state, the security device's local alarming features and the remote triggering alarming features may be deactivated and disarmed such that separation of the security device from the product does not cause a local and the security device no longer triggers a remote alarm associated with the theft deterrence equipment. Accordingly, in some example embodiments, a purchasing customer may leave the store and simply remove and dispose of the security device without the security device alarming. Alternatively, in some example embodiments, only the local alarm is disarmed, and the store personnel can remove the security device within the retail store and permit the customer to leave with the product without the security device affixed thereto.

With regard to deactivation, according to some example embodiments, a security device with local alarming tamper detection features and theft deterrence system alarming features may be disarmed at, for example, a POS via an associated deactivator. Such disarming via a deactivator may be performed as described in U.S. Pat. No. 11,250,677 issued Feb. 15, 2022, entitled ALARMING SECURITY DEVICE AND METHOD COMPRISING AN ELECTRONIC ARTICLE SURVEILLANCE TAG AND TAMPER DETECTION CIRCUITRY, which is incorporated by reference herein in its entirety.

According to some example embodiments, a security device may include tamper detection circuitry associated with a plunger switch and a depressable plunger that extends from the security device, and in some example embodiments through the engaging assembly, to be depressed by a product surface when applied to the product. If the plunger is extended, due to removal of the device from the product when the device is in an armed state, the device may cause a local alarm to be sounded in response to detection of the tamper event indicating that an unauthorized removal of the security device from the product has occurred. In other words, according to some example embodiments, the circuitry of the security device may include a plunger switch having a plunger positioned to actuate and trigger an audible tamper alarm, via associated processing circuitry and sounder, if the security device is pulled away from the product to which the security device is affixed while the security device is in the armed state.

According to some example embodiments, the circuitry of the security device may be disarmed to allow authorized removal of the security product from the product by a purchasing customer or store personnel. As mentioned above, to disarm the alarming features of the circuitry of the security device, the circuitry may be configured to, for example, detect a deactivator (e.g., an EAS deactivator) and, more specifically, the electromagnetic fields generated by the deactivator. The deactivator may be a device that can be used to deactivate certain EAS tags (e.g., labels) by altering or destroying the resonant characteristics of the tags using the electromagnetic field of the deactivator so that the EAS tag no longer resonates when exposed to a field within a given frequency band. As a result, the tag does not provide a resonant response signal when passing through, for example, EAS gates, and the therefore the EAS gates are not triggered to alarm.

In this regard, EAS tags, which may be an example of a wireless signal generator, may be of two types, i.e., deactivatable and non-deactivatable. Deactivatable EAS tags may be formed such that when a deactivatable EAS tag is subjected to an electromagnetic field having select characteristics (i.e., at a certain frequency and at certain power levels), the EAS tag may be deactivated. On the other hand, a non-deactivatable EAS tag may not be deactivated, and will continue to resonant, even after being exposed to an electromagnetic field that is attempting to deactivate that EAS tag. Accordingly, as referred to herein, a generic reference to an "EAS tag" may be referring to either a deactivatable or non-deactivatable EAS tag, unless the context deems otherwise. An example security device may include a wireless signal generator (e.g., deactivatable tag or non-deactivatable tag) that is detectable by the deactivator and an EAS gate of an EAS system. An EAS gate is typically installed at the ingress and egress of a retail store. The EAS tag may be an RF tag (e.g., resonant at 8.2 or 4.8 MHz) or an AM tag (e.g., resonant at 58 kHz). The EAS tag may be configured to resonate and return a signal to, for example, an EAS gate when exposed to an electromagnetic field at the resonant frequency of the EAS tag. Upon detecting the EAS tag's return signal, the EAS gate may trigger a gate alarm to indicate that a possible theft may be occurring.

Having generally described some aspects of various example embodiments, reference will now be made to the figures to describe additional and alternative example embodiments. In this regard, FIG. 1 illustrates an example security device 100 that is configured for application on curved surfaces of a product. The security device 100 may comprise a housing 110 that be an enclosure for internal electrical and mechanical components that support the theft deterrence and alarming features of the security device 100. In this regard, the housing 110 may be formed of, for example, molded plastic components that may be welded together to inhibit the ability to open or damage the housing 110. According to some example embodiments, on an outward-facing side, the housing 110 may comprise a sounder grill 112 that comprises openings in the housing 110 to increase the volume of an internal sounder. Additionally, the security device 100 may comprise a status indicator and an arming button. According to some example embodiments, the status indicator and the arming button may be integrated into a single assembly as shown in FIG. 1A. In this regard, the arming button 114 may be depressable to transition the security device 100 from a disarmed state to an armed state, in some instances, when a plunger is also depressed due to the security device 100 having been applied to a product. The arming button 114 may also include or be a light pipe for, a light that indicates a status (e.g., armed, disarmed, etc.) of the security device 100.

Figure 1B:
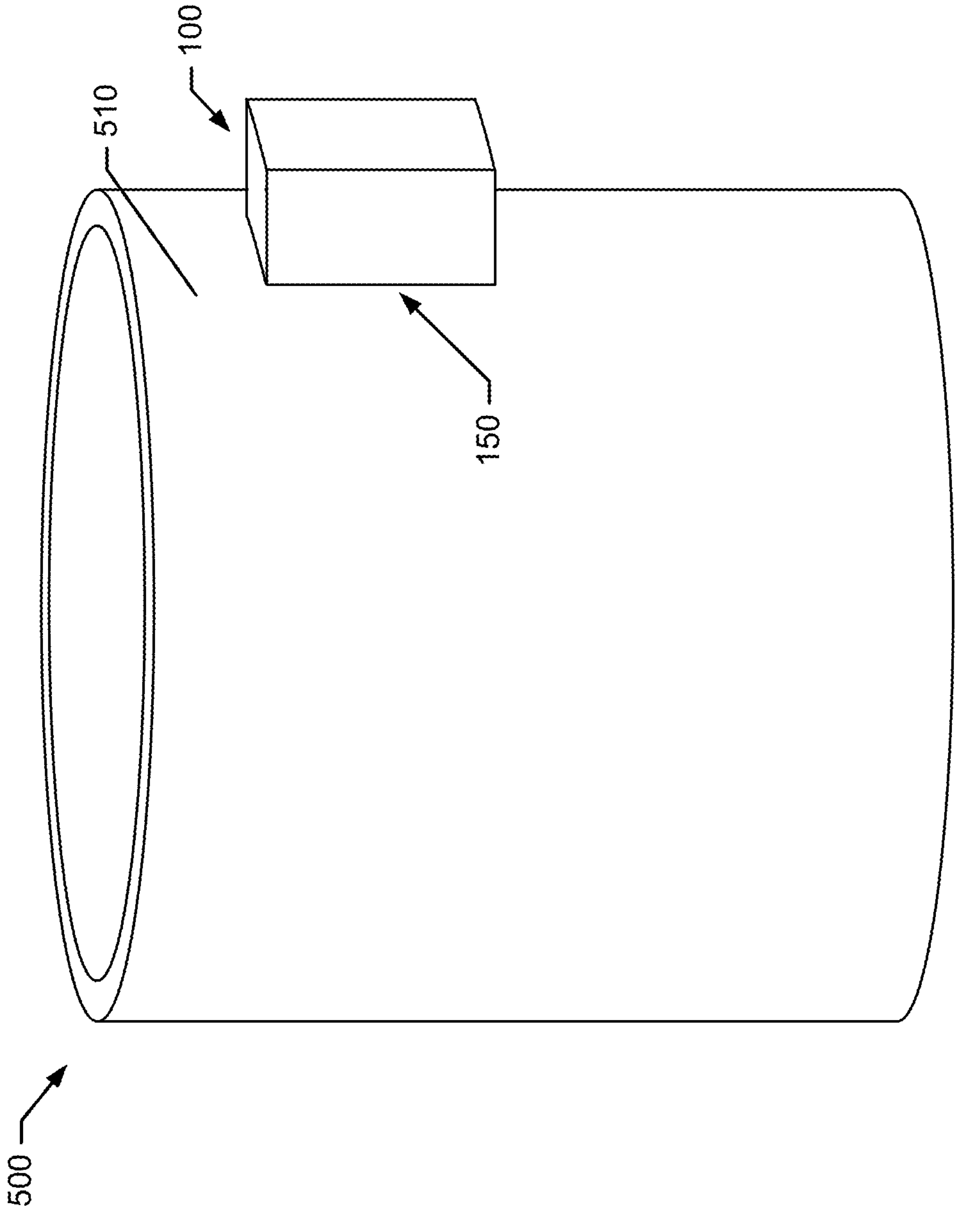
FIG. 1B illustrates a security device affixed to a product having a curved surface according to some example embodiments.

On a side of the housing 110 that is opposite the outward facing side (i.e., a product-facing side), according to some example embodiments, the security device 100 may comprise an engaging assembly 150, as further described in more detail below and may comprise a curved base 152, as shown in FIG. 1A. The curved base 152 may be configured to conform to a curved surface of a product. According to some example embodiments, an adhesive pad or other adhesive element may be disposed between curved base 152 and the curved surface of the product to affix the security device 100 to the product. As mentioned above and otherwise herein, the engaging assembly 150 may also include flexible wings that facilitate securing the security device 100 to the curved surface of the product, and the adhesive pad may additionally or alternatively be applied to the flexible wings. With reference to FIG. 1B, a product 500 in the form of a can or cup is shown with the security device 100 affixed thereto. The engaging assembly 150 permits the security device 100 to be securely affixed to the curved surface 510 of the product 500.

Figure 2A:
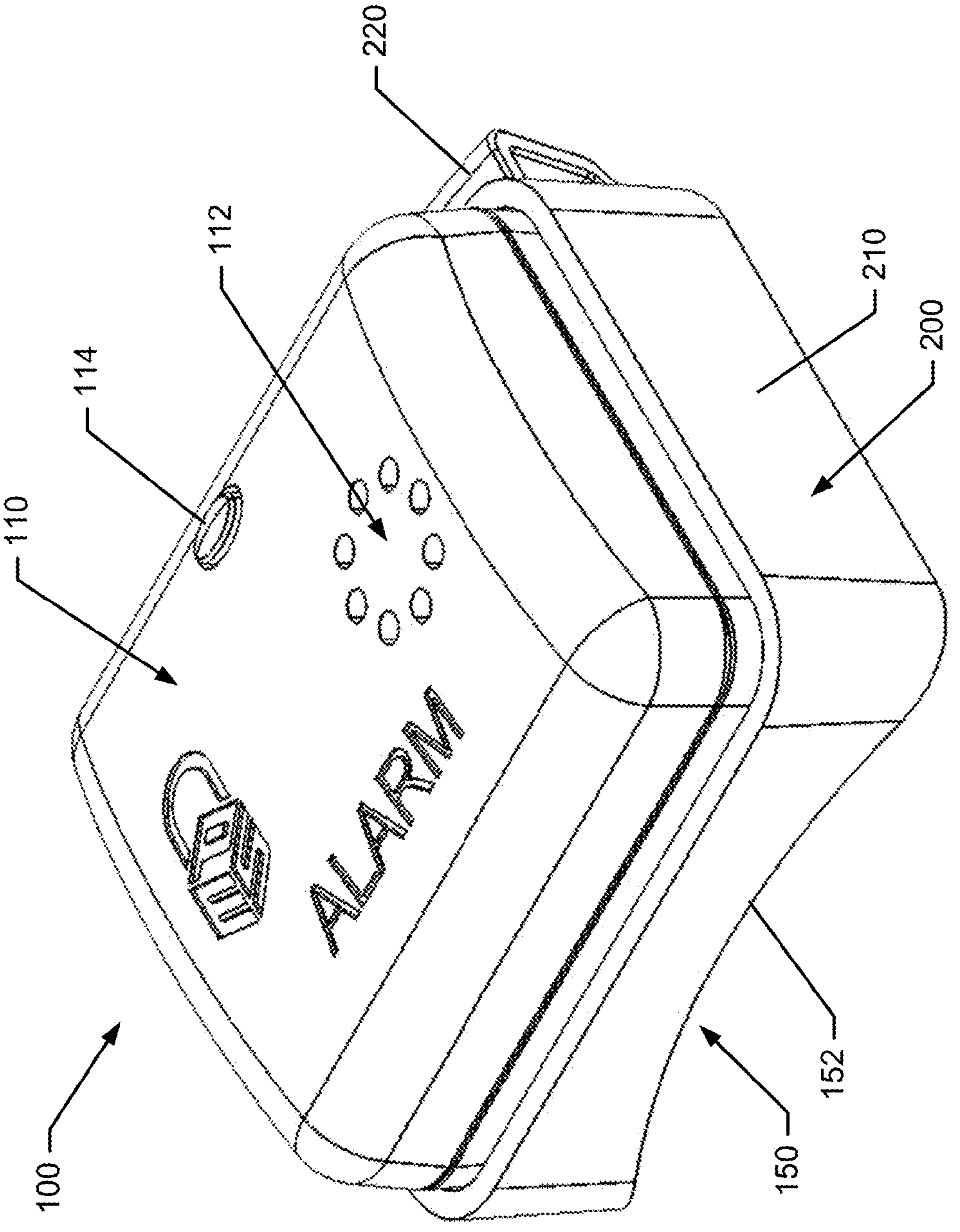
FIG. 2A illustrates a security device with a hook member according to some example embodiments.

FIG. 2A shows the security device 100 with an example clip 200 attached. The clip 200 may be one form of a complementary mechanical device to the security device 100 that may permit the security device 100 to expand its security functionality. In this regard, the security device 100 may include a hook member 220, directly or via the clip 200, such that the hook member 220 is securely coupled to the security device 100. The hook member 220 may extend from the housing 110 of the security device 100 and the hook member 220 may be angled to pass through or hook into another product. The hook member 220 may also be used to simply hold another product in place by inhibiting an ability to separate the product from being in contact with the hook member 220. In some instances, the second product that the hook member 220 engages with may be an accessory product to the product to which the engaging assembly 150 is operably coupled. For example, the accessory product may be a lid of the cup or flask.

According to some example embodiments, the clip 200 may include a collar 210 that may conform to and wrap around the engaging assembly 150 or housing 110 of the security device 100. As such, the collar 210 may slide onto the security device 100 such that at least a portion of the collar 210 is either disposed between the engaging assembly 150 and the curved surface of the product to which the security device 100 is affixed. Alternatively, the collar 210 may otherwise be incapable of being removed from the security device 100 (e.g., due to an expanding shape of the housing 110 or a lip within the collar 210) without removing the security device 100 from the product. Further, according to some example embodiments, the collar 210 may conform to the housing 110 such that the collar 210 does not inhibit the ability of the engaging assembly 150 to operably couple to a product.

Figure 2B:
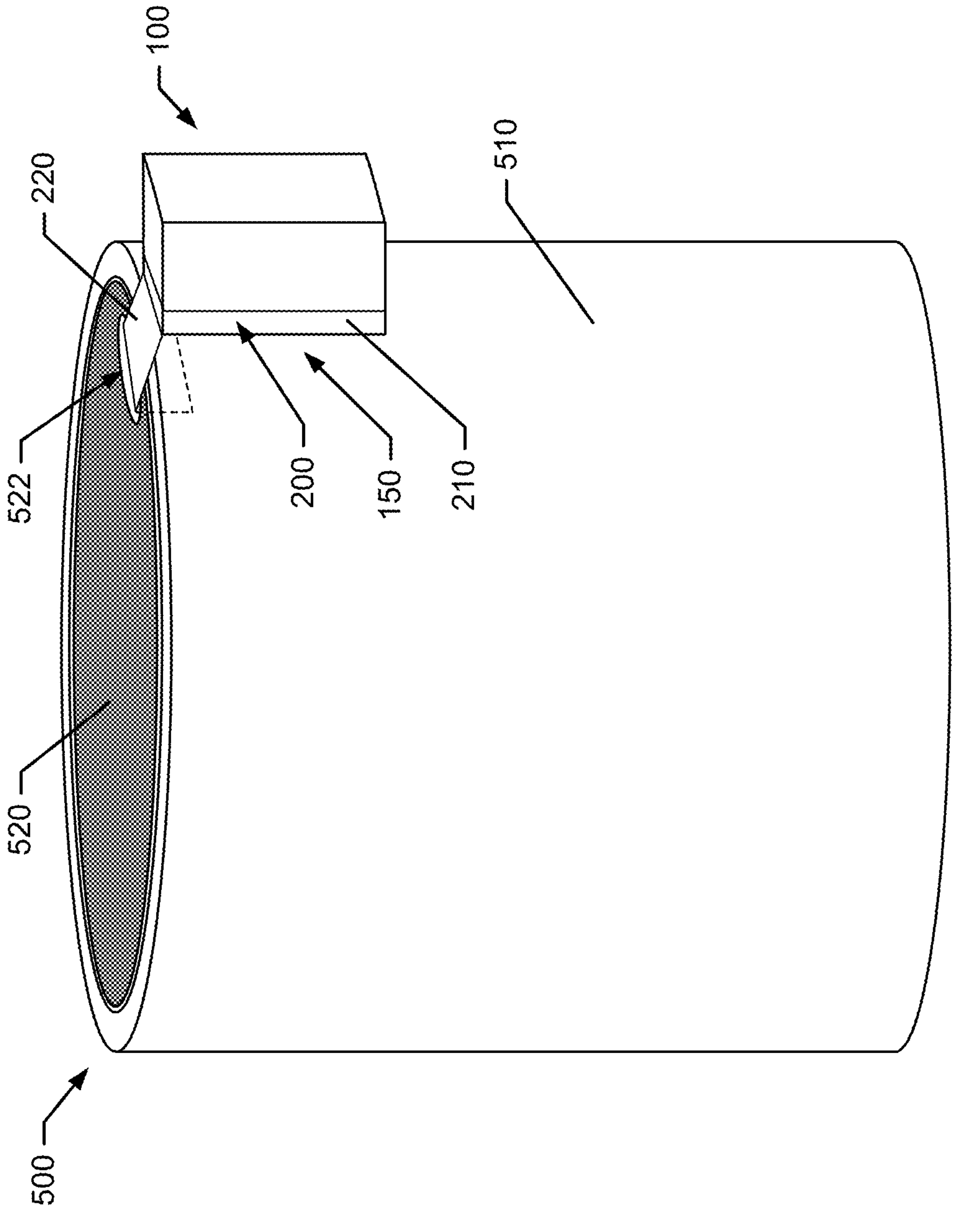
FIG. 2B illustrates a security device with a hook member affixed to a product having a curved surface and a lid according to some example embodiments.

With reference to FIG. 2B, the security device 100 with the clip 200 is shown applied to the product 500. However, the product 500 is now coupled to an accessory product in the form of a lid 520. The lid 520 is shown in position on top of the product 500 and covering a top opening in the product 500. The lid 520 includes an aperture 522, which may be a drinking aperture. Accordingly, the security device 100 may be secured to the curved surface 510 of the product 500 such that the hook member 220 passes through the aperture 522. Alternatively, the hook member 220 may be in contact with a top surface of the lid 520. Since the hook member 220 is affixed to the security device 100, the lid 520 cannot be removed from the product 500 without removing the security device 100 due to the hook member 220. As shown, the security device 100 is again affixed to the curved surface 510 of the product 500 via the engaging assembly 150. Additionally, the hook member 220 is shown as extending from the clip 200, and the clip 200 is secured to the security device 100 via the collar 210.

Figure 3A:
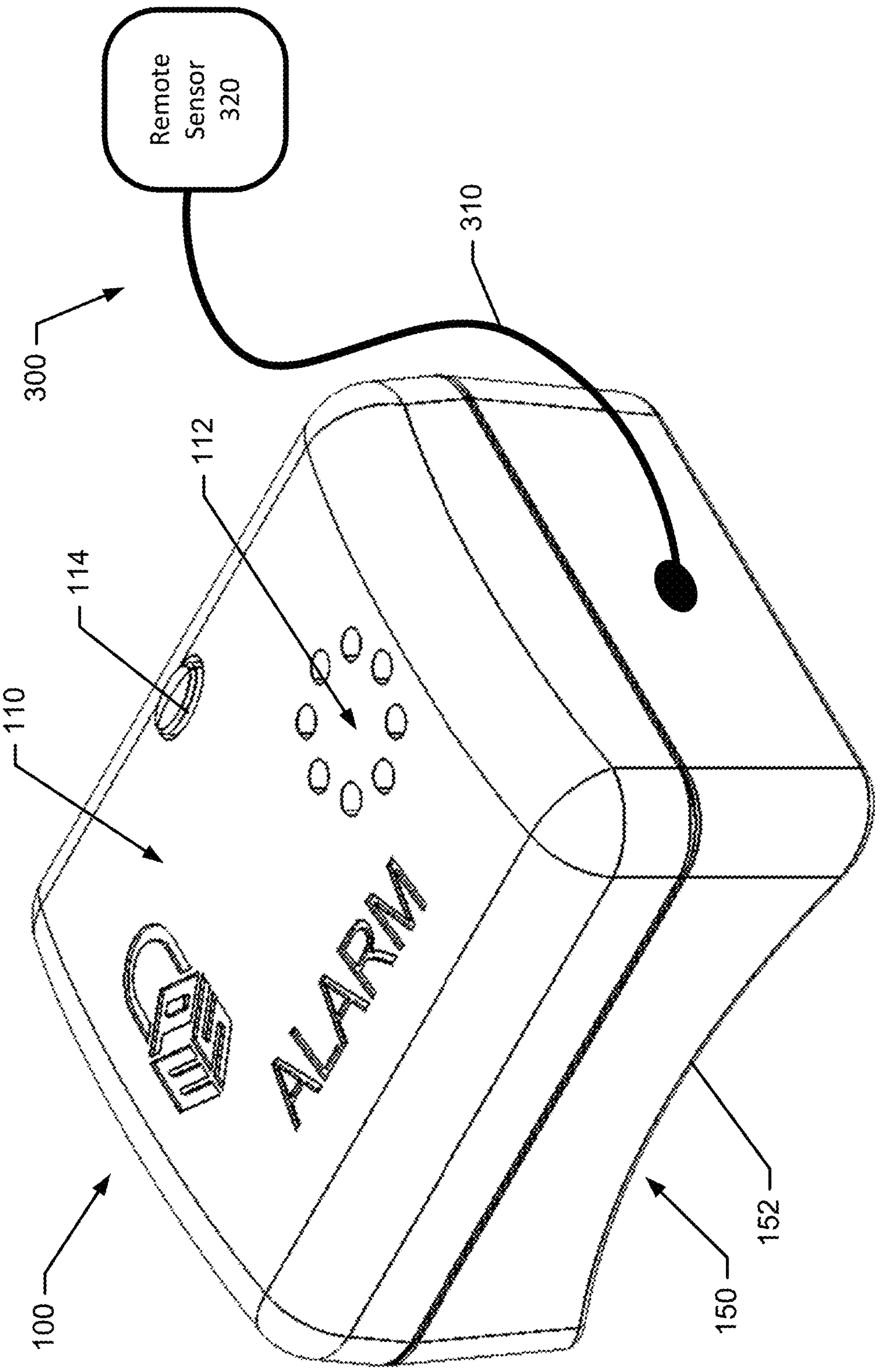
FIG. 3A illustrates a security device with a sensor device according to some example embodiments.

FIG. 3A shows the security device 100 with an example sensor device 300 attached. The sensor device 300 may be another form of a complementary device to the security device 100 that may permit the security device 100 to expand its security functionality. In this regard, the sensor device 300 may comprise a tether 310 that may be formed as or a component of a sense loop. According to some example embodiments, a remote sensor 320 may be electrically connected to the tether 310. The remote sensor 320 may include, for example, a sensor plunger switch that can detect when the remote sensor 320 is removed from a surface due to actuation of a plunger of the sensor plunger switch. As such, the remote sensor 320 may be affixed to a surface via an adhesive to secure the remote sensor 320 to a surface and maintain the plunger in a depressed position. The security device 100 may be configured to sound a local alarm in the event that the tether 310 is severed or the remote sensor 320 is removed from a surface to which the remote sensor 320 is protecting (e.g., causing the plunger of the remote sensor 320 to be extended due to the plunger being biased into the extended position). In this regard, the sensor device 300 may be electrically connected to the security device circuitry.

Figure 3B:
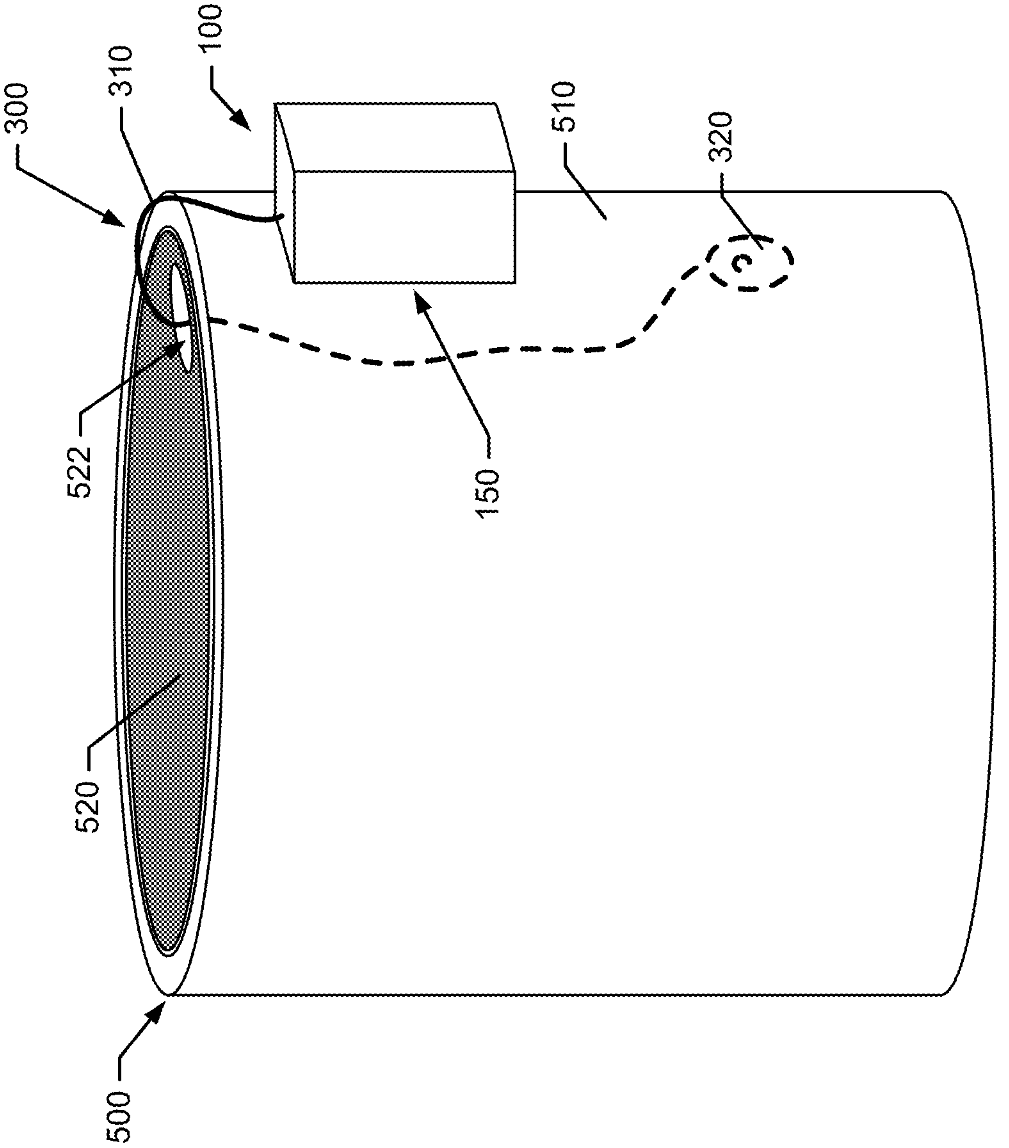
FIG. 3B illustrates a security device with a sensor device affixed to a product having a curved surface and a lid according to some example embodiments.

With reference to FIG. 3B, the security device 100 with the sensor device 300 is shown applied to the product 500 with the lid 520. Accordingly, the security device 100 may be secured to the curved surface 510 of the product 500, and the remote sensor 320 may be passed through the aperture 522 and affixed to an interior surface of the product 500 to protect the lid 520. As such, the lid 520 cannot be removed from the product 500 because the remote sensor 320 is secured to the interior surface of the product 500 on one end of the tether 310 and the security device 100 is secured to the external surface of the product 500 at the other end of the tether 310. In this regard, the local alarm of the security device 100 would sound in the event that the remote sensor 320 is removed from the internal surface, the security device 100 is removed from the external surface (i.e., curved surface 510), or the tether 310 is severed.

Figure 4:
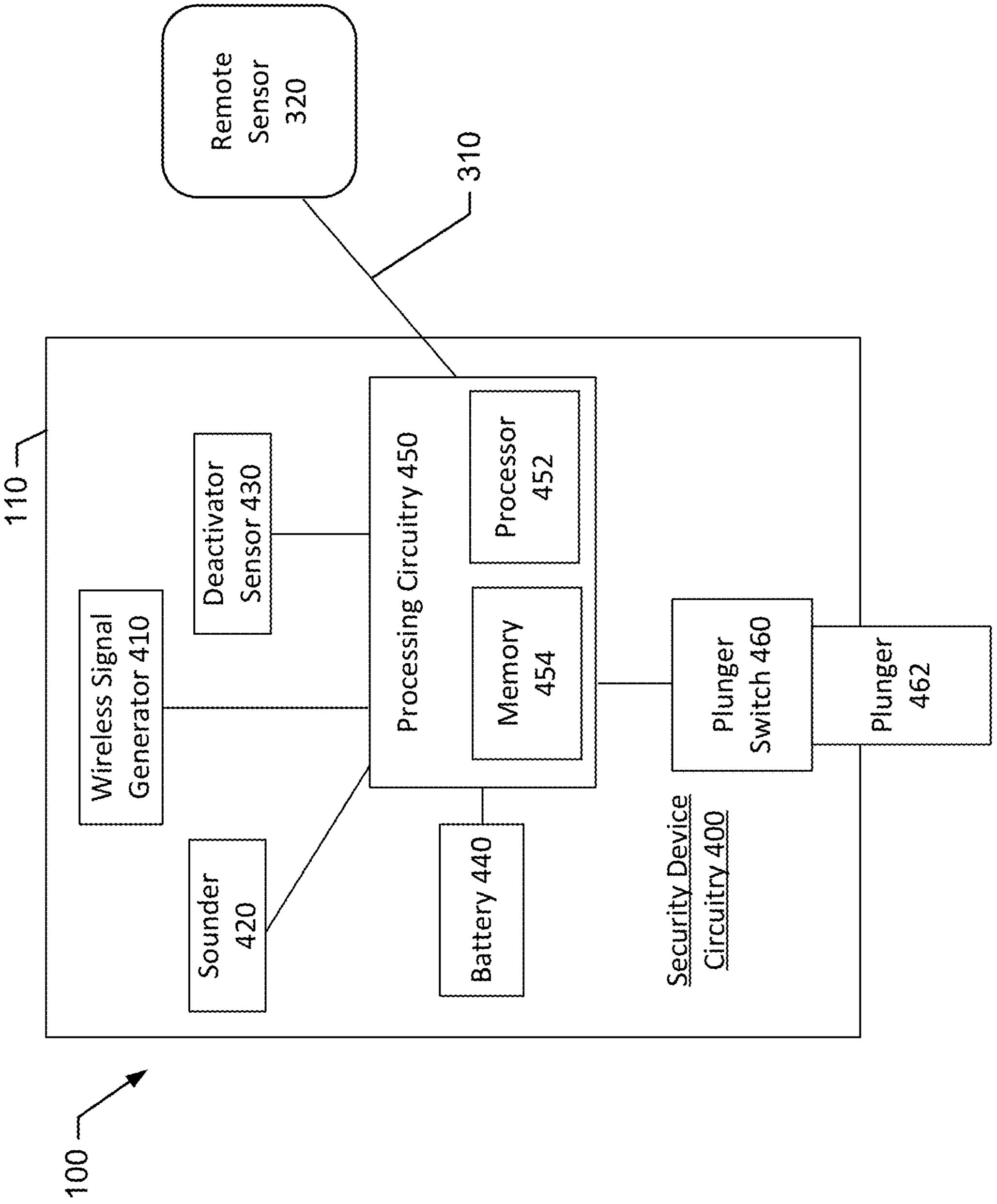
FIG. 4 illustrates a block diagram of some of the electrical and otherwise internal components of a security device according to some example embodiments.

Now referring to FIG. 4, a block diagram of the functional components of the security device 100 are shown. A circuit board may, for example, provide structural support and electrical connections between the various circuitry components of the security device 100 that are disposed within the housing 110. In this regard, security device circuitry 400 may comprise a wireless signal generator 410, a sounder 420, a deactivation sensor 430, a battery 440, processing circuitry 450, and a plunger switch 460. The processing circuitry 450 may comprise a processor 452 and a memory 454. The plunger switch 460 may comprise a plunger 462 according to some example embodiments. Additionally, a remote sensor 320 may be electrically coupled to the processing circuitry 450 via a tether 310.

The wireless signal generator 410 may be a device that outputs a wireless signal in response to a detection of a field generated by theft deterrence equipment such as an EAS gate or the like. In this regard, according to some example embodiments, the wireless signal generator 410 may include a field detector configured to detect a field of a target frequency for theft deterrence equipment (e.g., 8.2 or 4.8 MHz for radio frequency (RF) theft deterrence systems or 58 kHz for acuosto-magnetic (AM) theft deterrence systems). In some example embodiments, the wireless signal generator 410 may comprise an antenna that is driven by the processing circuitry 450 to output a desired signal responsive to the detection of a field. However, according to some example embodiments, the wireless signal generator 410 may comprise a resonant circuit that emits a responsive signal in the presence of a field at resonant frequency of the circuit. Further, the wireless signal generator 410 may be, for example, an RF EAS tag or an AM EAS tag.

The sounder 420 may be any type of device that may be driven to produce an audible sound for an alarm. In this regard, the sounder 420 may be embodied as a speaker, piezoelectric sounder, or the like. The sounder 420 may be driven by the processing circuitry 450 to cause an alarm to sound when triggered by the processing circuitry 450 (e.g., due to extension of the plunger 462, severing of the tether 310, removal of the remote sensor 320 from a surface, or the like). The battery 440 may be one example of a power source that operates to provide electrical power to the various electrical components of the security device 100, including the processing circuitry 450.

The plunger switch 460 may operate with the plunger 462 to form a tamper sensor that can detect when the security device 100 is being removed from a product to which the security device 100 is affixed. In this regard, the plunger switch 460 may be operably coupled to the plunger 462 such that, based on the state of the plunger 462, the plunger switch 460 will provide an associated electrical output (e.g., a closed circuit, an open circuit, etc.). In this regard, when the plunger 462 moves, for example, between a depressed position and an extended position, the plunger switch 460 transitions from a first switch state (e.g., closed) to a second switch state (e.g., open) and provides associated electrical output to the processing circuitry 450 indicative of the position of the plunger 462. According to some example embodiments, the plunger 462 may be biased towards an extended position (e.g., extending downward) by, for example, a spring.

The deactivator sensor 430 may be electrically connected to the processing circuitry 450. The deactivator sensor 430 may be configured to detect an electromagnetic field, for example, generated by an EAS deactivator. In this regard, the deactivator sensor 430 may be an antenna that is implemented in the form of an inductor, a resonant circuit, a reed switch, or the like. In this regard, the deactivator sensor 430 may have an output in the form of a deactivation signal that is provided to the processing circuitry 450 for evaluation. According to some example embodiments, the wireless signal generator 410 may operate with or as the deactivator sensor 430, and a separate deactivator sensor 430 need not be included. The processing circuitry 450 may be connected to the wireless signal generator 410 or the deactivation sensor 430 and the processing circuitry 450 may be configured to detect a field of theft deterrent equipment due to the presence of an EAS gate or deactivator field. According to some example embodiments, the deactivator sensor 430 may be configured to detect a field generated by an EAS tag operating as an example of the wireless signal generator 410.

According to some example embodiments, to detect a deactivator signal from an EAS deactivator, the processing circuitry 450 of the security device 100 may be configured to detect characteristics of the deactivation field. These characteristics may be different from those of a field, for example, generated by an EAS gate at an exit of a retail store, and therefore the processing circuitry 450 may be configured to differentiate between a deactivation field and a gate field. In this regard, the processing circuitry 450 may be able to trigger functionality based on the detection of a deactivation field, such as disarming the tamper detection functionality to prevent alarming. According to some example embodiments, the processing circuitry 450 may be configured to leverage the deactivator sensor 430 to detect relatively high power pulses, at a given rate and at one or more given frequencies that would indicate the presence of an EAS deactivator attempting to deactivate, for example, an RF EAS tag. Alternatively, the security device circuitry 400 may be configured to leverage the deactivator sensor 430 to detect a deactivation field in the form of a degaussing field that oscillates at a given frequency (e.g., 800 Hz) and then decays in power over time (e.g., 25% decay rate), which would indicate the presence of an EAS deactivator attempting to deactivate, for example, an AM EAS tag. Further, according to some example embodiments, the deactivator sensor 430 may be configured and positioned within the security device 100 to detect changes in the deactivator field caused by presence of the EAS tag as the wireless signal generator 410 to determine the presence of an EAS deactivator. Further, the deactivator sensor 430 may be configured to detect a field generated by magnetism of the wireless signal generator 410 embodied as a deactivatable AM EAS tag housed within the security device 100. In this regard, when such a deactivatable AM EAS tag is subjected to a deactivation field, the deactivatable AM EAS tag may become demagnetized. As such, the deactivator sensor 430 may no longer detect the field of the deactivatable AM EAS tag, which may be indicative of the presence of an EAS deactivator.

The processing circuitry 450 may comprise a processor 452 and a memory 454. In this regard, the processor 452 may be any type of processing device that is either hardware configured to perform defined functionalities (e.g., an field programmable gate array (FPGA) or an application specific integrated circuit (ASIC)) or the processor 452 may be configured via execution of instructions (e.g., compiled software or firmware instructions), possibly stored in the memory 454. The security device circuitry 400 and, more specifically the processing circuitry 450, may be configured to perform various functionalities.

As such, the processing circuitry 450 may be configured control the sounder 420 to cause the sounder 420 to emit the audible alarm sound in response to various inputs. For example, the processing circuitry 450 may be configured to cause the sounder 420 to emit the audible alarm sound in response to an electrical output from the plunger switch indicating that the plunger has moved from the depressed position (i.e., the security device 100 attached to a product) to the extended position (i.e., the security device 100 has been removed from the product, for example, without first being deactivated or disarmed). Additionally or alternatively, the processing circuitry 450 may be configured to cause the sounder 420 to emit the audible alarm sound in response to detection of the tether 310 being severed (e.g., a break in a sense loop including the tether 310) or a triggering from the remote sensor 320 due to a sensor plunger being actuated due to removal of the remote sensor 320 from the product surface.

Figure 5A:
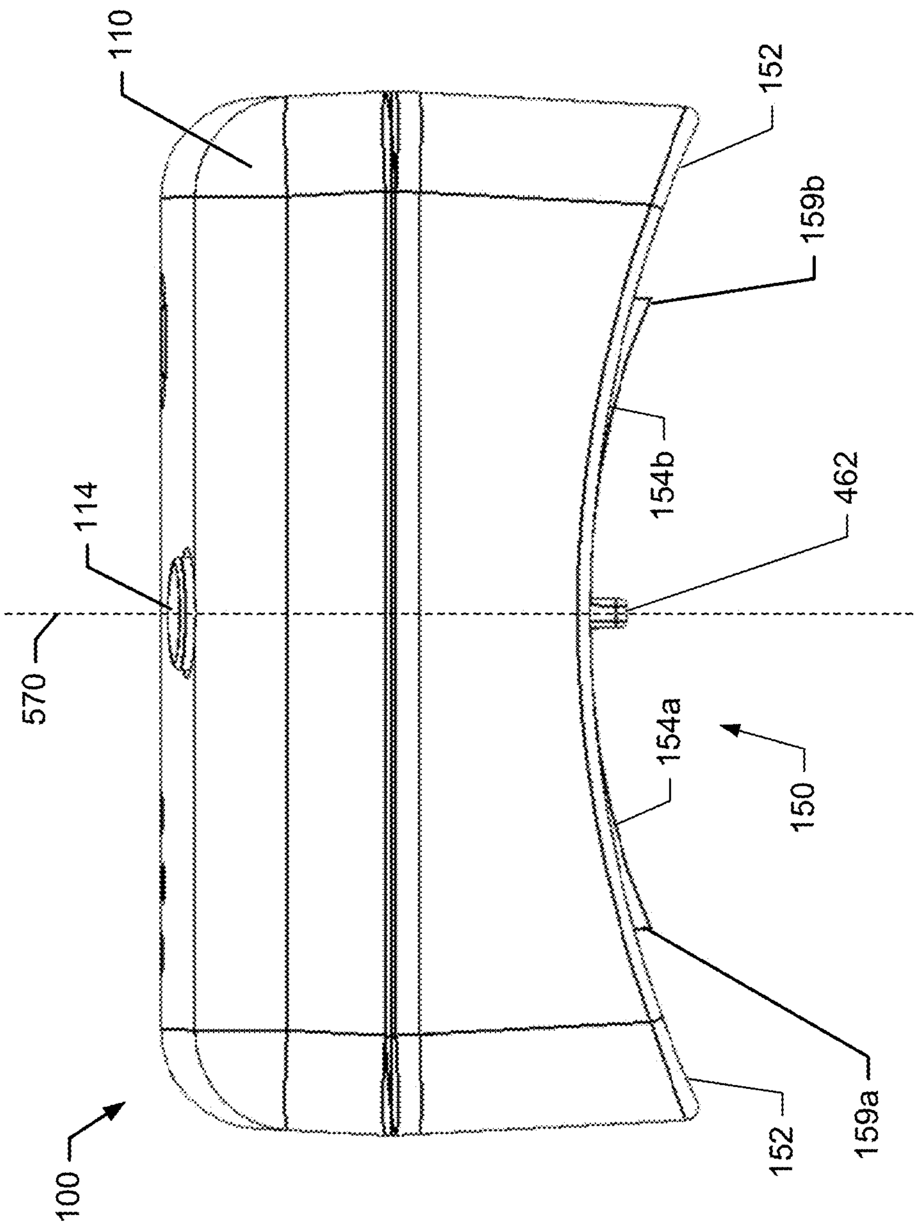
FIG. 5A illustrates a side view of a security device with flexible wings and an extended plunger according to some example embodiments.
Figure 5B:
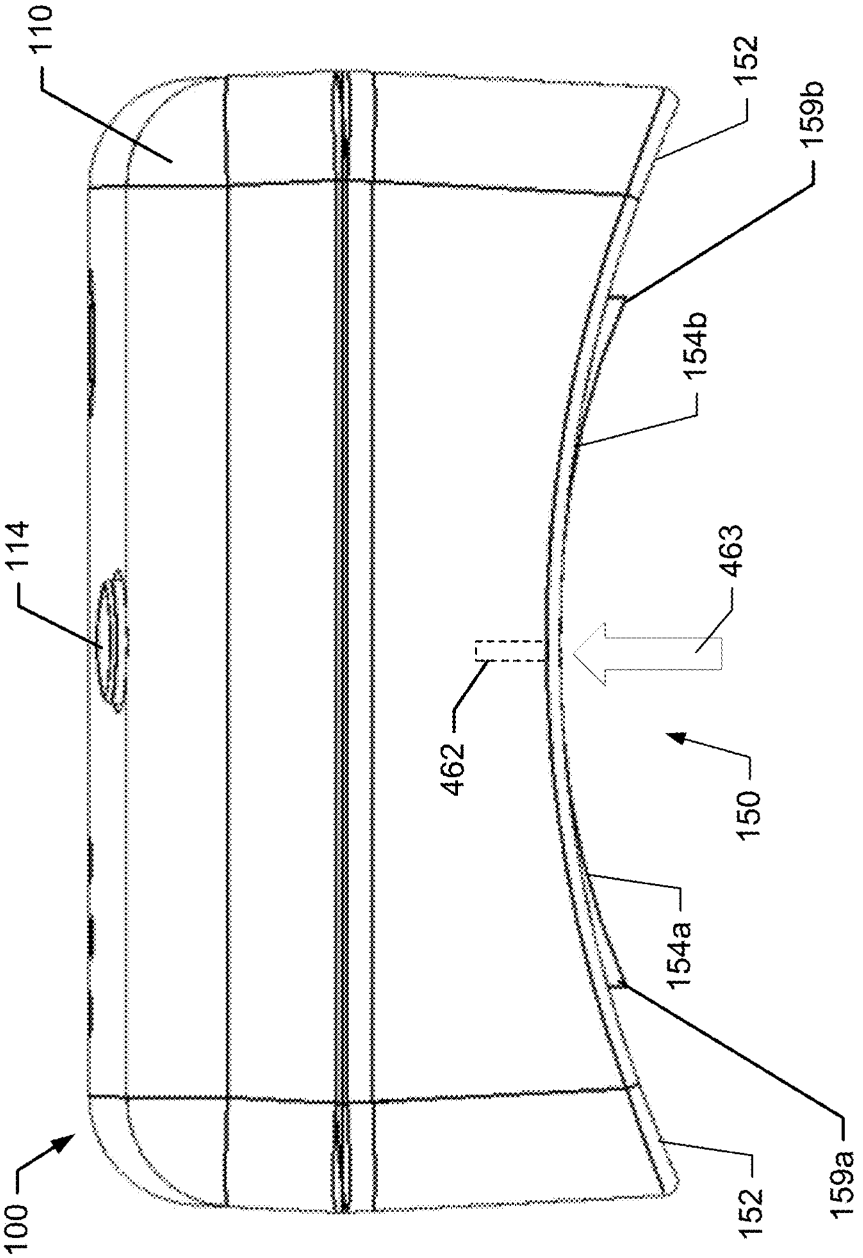
FIG. 5B illustrates a side view of a security device with flexible wings and a depressed plunger according to some example embodiments.

Referring now to FIGS. 5A and 5B, a side view of the security device 100 is shown such that features of the engaging assembly 150 can be seen. In this regards, the engaging assembly 150 may comprise a curved base 152 and a plurality of flexible wings. The curved base 152 may be a fixed surface that extends from or is integrated with the housing 110. In some example embodiments, the curved base 152 may be a rigid base portion of the housing 110. As further described below, the curved base 152 may have a curvature that defines, for example, one bound of a range of product surface curvatures that the security device 100 may be affixed to.

The plurality of flexible wings may comprise any number of flexible wings, however, according to some example embodiments, the engaging assembly 150 may comprise two flexible wings comprising flexible wing 154*a* and flexible wings 154*b*. Each of the flexible wings 154 may extend from a central plane 570 and may be attached to the housing 110 adjacent the central plane 570 that, according to some example embodiments, symmetrically bisects the engaging assembly 150 of the security device 100. According to some example embodiments, each wing 154 may be generally shaped as a rectangular element that may, but need not be, curved. One edge of the wing 154 may be attached to a base portion of the housing 110, while the other three edges may be unconnected and separated from the curved base 152 and the housing 110 to permit the wing 154 to flex about the attached edge of the wing 154. Accordingly, the attached edge of the wing 154 may operate as a pivot for the wing 154 to permit the wing 154 to flex inwards when the engaging assembly 150 is applied to a curved surface of a product.

As shown in FIG. 5A, the wing tips 159*a* and 159*b* of the wings 154*a* and 154*b*, respectively, (i.e., opposite the attached edges) extend away from the curved base 152 and the product-facing side of the housing 110, such that the curvature of the wings 154*a* and 154*b* is not parallel with the curvature of the curved base 152. Additionally, the wings 154*a* and 154*b* may be positioned such that the wing 154*a* is symmetric to the wing 154*b* relative to the central plane 570. Additionally, the plunger 462 is shown in the extended position in FIG. 5A, and in the depressed position in FIG. 5B. With respect to FIG. 5B, the security device 100 may be applied to a product to cause the plunger 462 to be depressed, as indicated by the arrow 463.

Figure 5C:
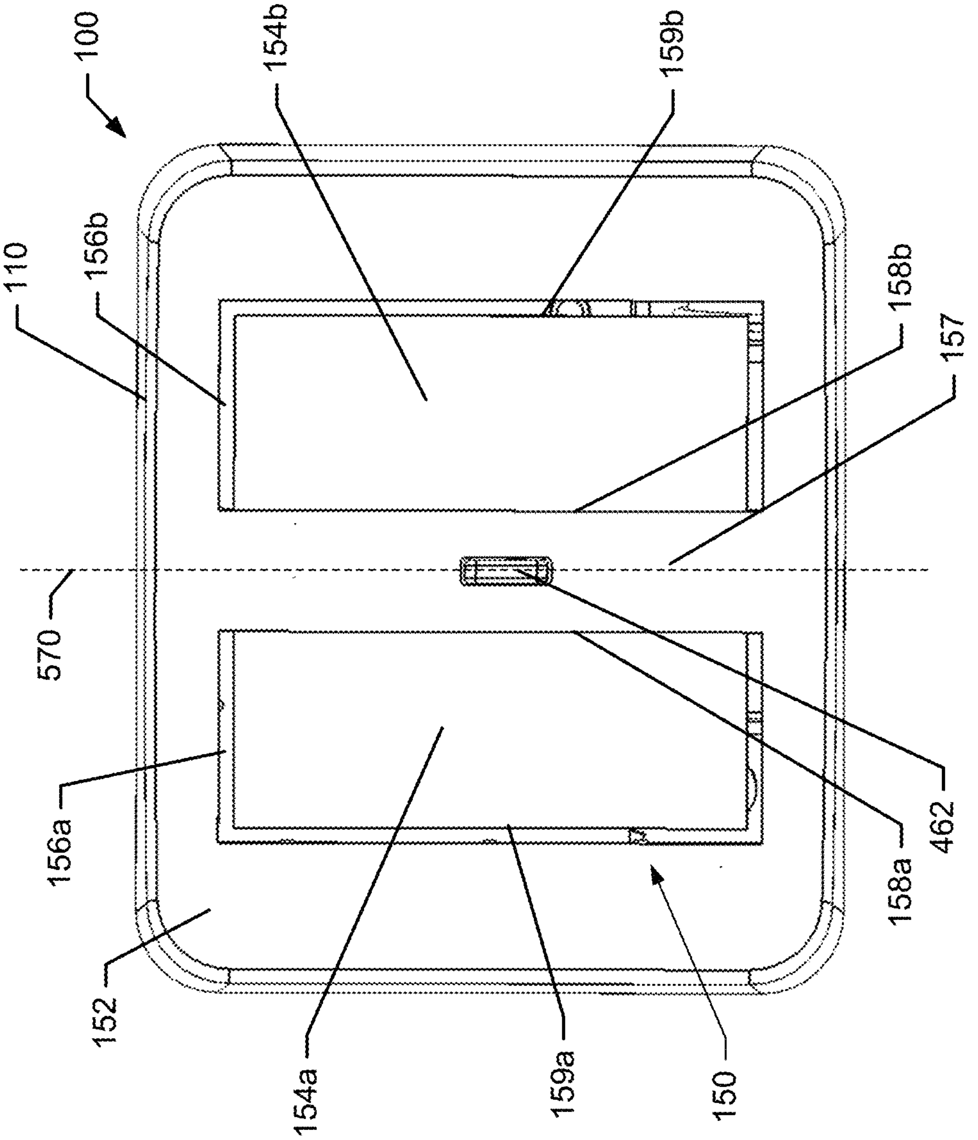
FIG. 5C illustrates a product-side view of a security device showing the engaging assembly according to some example embodiments.

Referring to FIG. 5C, the product engaging side of the security device 100 is shown. In this regard, details of the engaging assembly 150, according to some example embodiments, are shown, including the curved base 152 and the flexible wings 154*a* and 154*b*. The flexible wing 154*a* may extend from the attachment edge 158*a* that attaches the flexible wing 154*a* to a central base portion 157. The flexible wing 154*a* may be otherwise unattached to the housing 110 to permit the flexible wing 154*a* to flex or bend. The wing

154*a* may extend away from the attachment edge 158*a* to the wing tip 159*a* disposed on the edge opposite the attachment edge 158*a*. As shown in FIG. 5C, because the flexible wing 154*a* may, according to some example embodiments, only be attached at the attachment edge 158*a*, the wing 154*a* may be positioned over an opening 156*a* behind the wing 154*a* that provides clearance for the wing 154*a* to flex towards the internal cavity of the housing 110. Further, the flexible wing 154*b* may extend from the attachment edge 158*b* that attaches the flexible wing 154*b* to a central base portion 157. The flexible wing 154*b* may be otherwise unattached to the housing 110 to permit the flexible wing 154*b* to flex or bend. The wing 154*b* may extend away from the attachment edge 158*b* to the wing tip 159*b* disposed on the edge opposite the attachment edge 158*b*. As shown in FIG. 5C, because the flexible wing 154*b* may, according to some example embodiments, only be attached at the attachment edge 158*b*, the wing 154*b* may be positioned over an opening 156*a* behind the wing 154*a* that provides clearance for the wing 154*a* to flex towards the internal cavity of the housing 110. Further, the plunger 462 may pass through an opening in, for example, the central base portion 157, and the engaging assembly 150 may be bilaterally symmetric relative to the plane 570 that, according to some example embodiments, passes through the plunger 462.

Figure 5D:
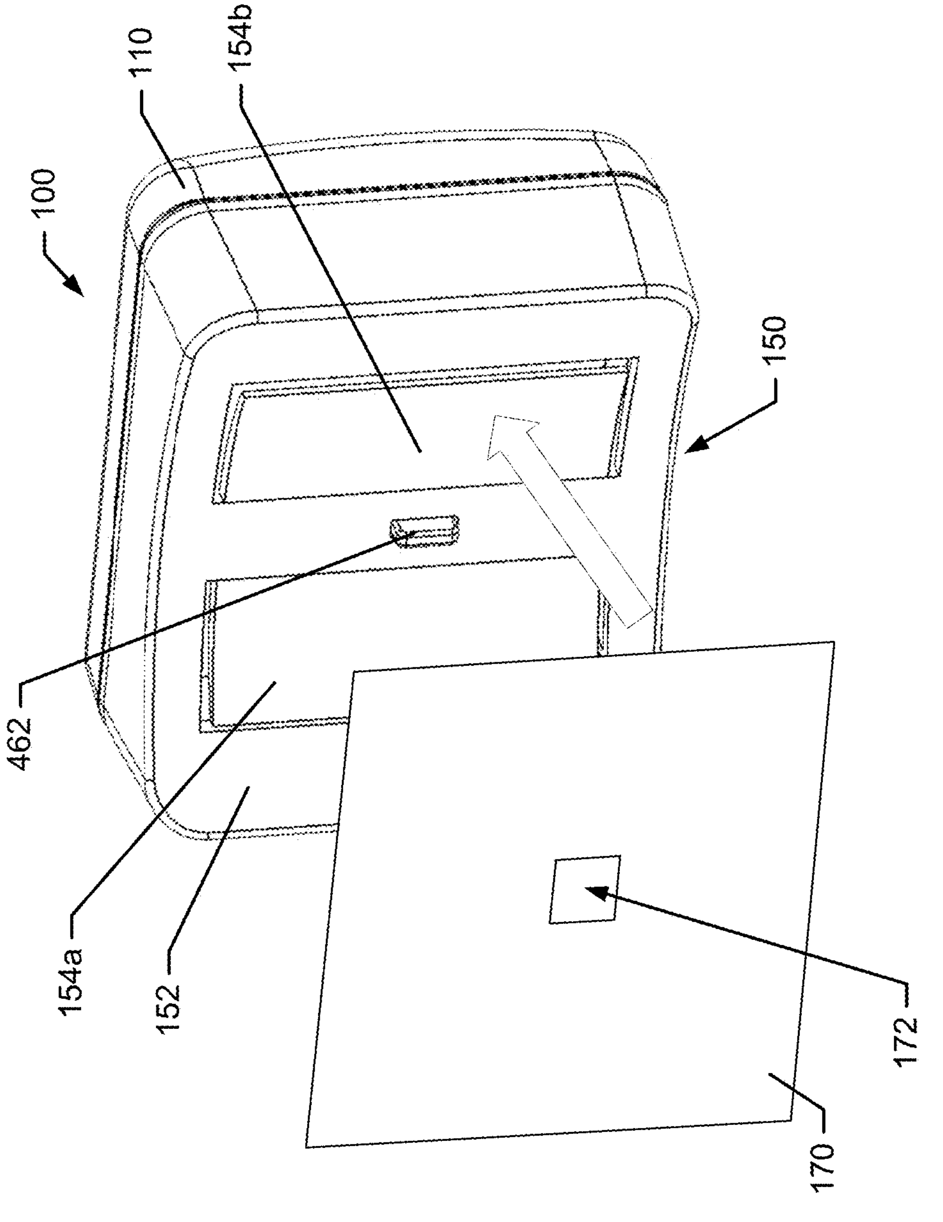
FIG. 5D illustrates a product-side perspective view of a security device with an adhesive pad according to some example embodiments.
Figure 5E:
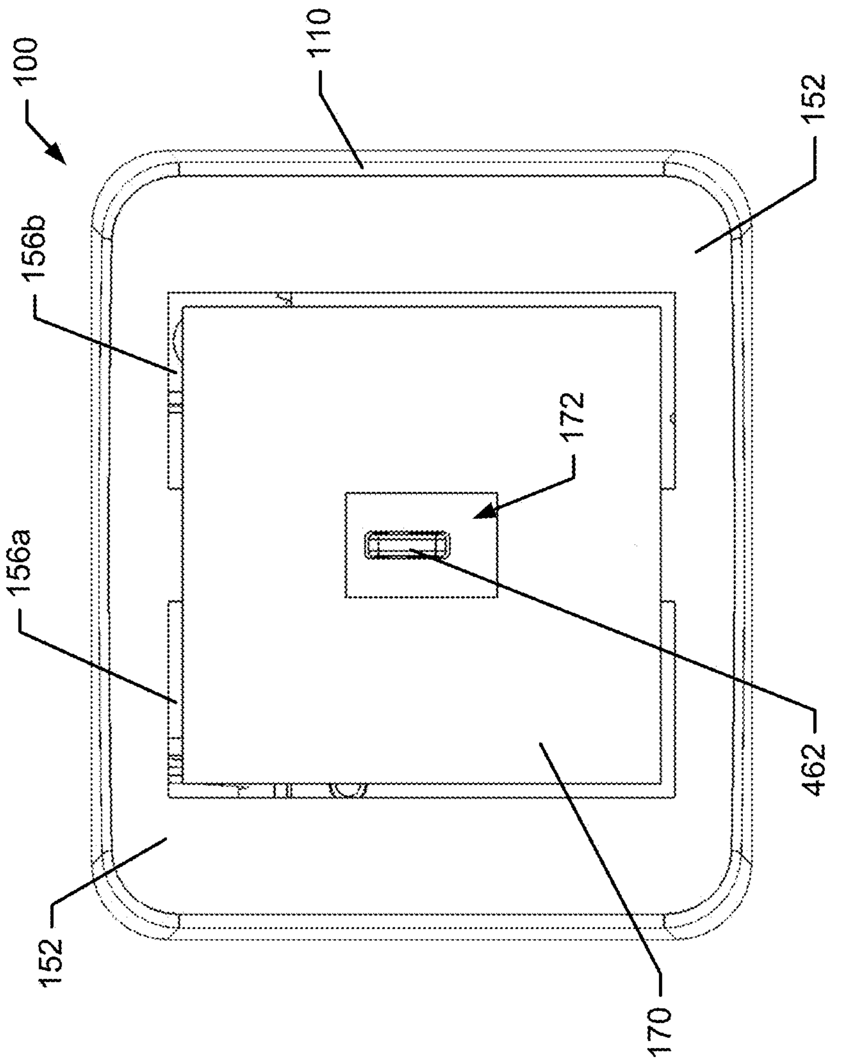
FIG. 5E illustrates a product-side view of a security device showing the adhesive pad affixed to the engaging assembly according to some example embodiments.

As shown in FIG. 5D, an adhesive pad 170 may be included, according to some example embodiments. The adhesive pad 170 may comprise a pressure activated adhesive that may be applied to two sides of the adhesive pad 170. According to some example embodiments, the adhesive pad 170 may include a window 172 through which the plunger 462 may pass, when the adhesive pad 170 is applied to the engaging assembly 150 of the security device 100. As shown in FIG. 5D, the adhesive pad 170 may be applied to the engaging assembly 150, and more specifically, the flexible wings 154*a* and 154*b*. In some example embodiments, a second adhesive pad (not shown) may be applied to the curved base 152. FIG. 5E illustrates the adhesive pad 170 applied to the flexible wings such that the adhesive pad 170 overlaps the flexible wings.

Figure 5F:
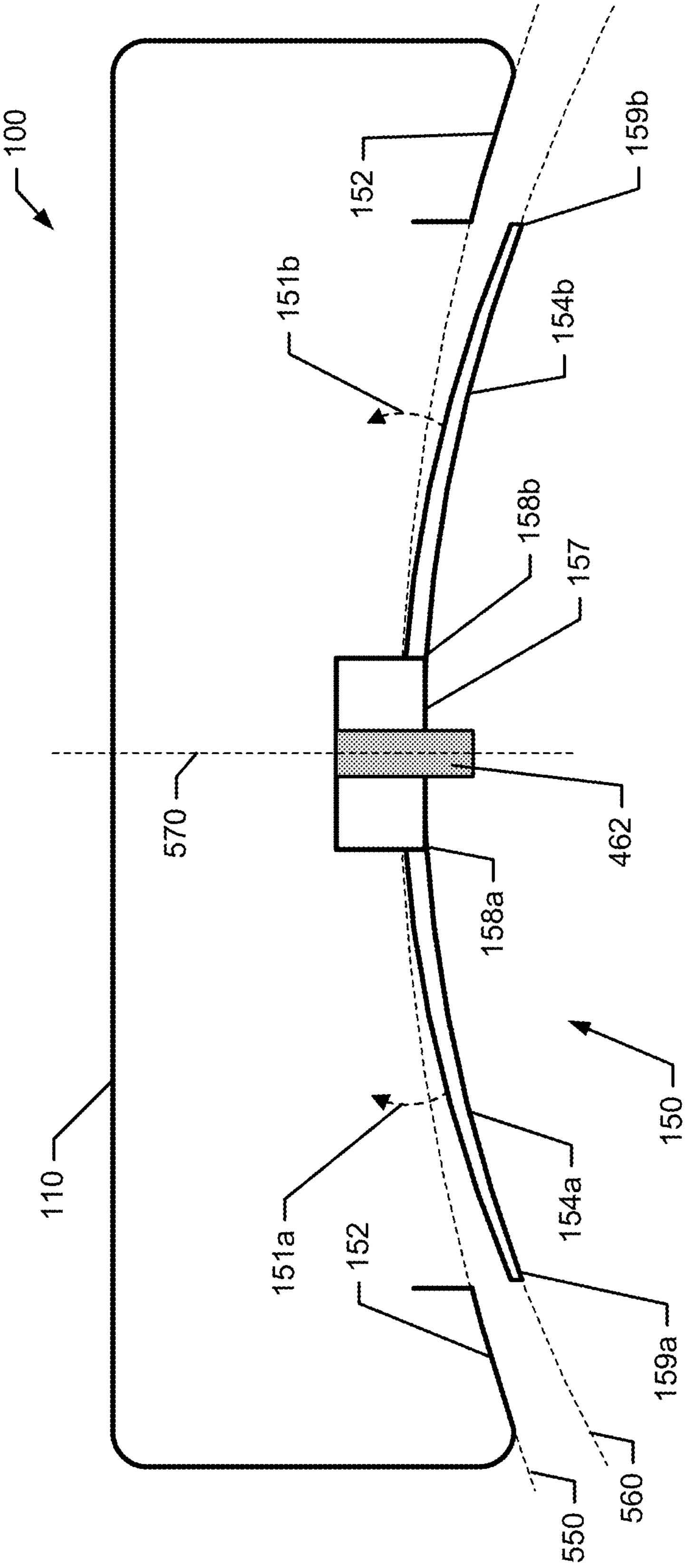
FIG. 5F illustrates a simplified cross-section view of the security device showing the engaging assembly according to some example embodiments.

According to some example embodiments, FIG. 5F illustrates a cross-section view of the security device 100 that shows the relative positioning of the components of the engaging assembly 150. In this regard, the curved base 152 may have a first or base curvature 550 and the flexible wings 154*a* and 154*b*, when the flexible wings 154*a* and 154*b* are not bent or deflected, may have a second or wing curvature 560. The second curvature 560 may be a higher degree of curvature than the first curvature 550. Accordingly, due to the flexibility of the wings 154, the range of curvatures for product surfaces that the engaging assembly 150 may span from the first curvature 550 to the second curvature 560. As such, according to some example embodiments, the engaging assembly 150 may be configured to fit, for example, cup diameters from about 2.5 inches to about 4 inches or about 6.25 inches to about 7.75 inches. The ability of the wings 154*a* and 154*b* to flex is indicated by arrows 151*a* and 151*b*, respectively. According to some example embodiments, to increase the flexibility of the wings 154*a* and 154*b*, a thickness of the wings 154*a* and 154*b* may decrease from the attachment edge 158*a* and 158*b* to the wing tips 159*a* and 159*b*, respectively. In this regard, a thickness, for example, of the wing 154*a* adjacent to the attachment edge 158*a* may be greater than a thickness at the wing tip 159*a*. A thickness, for example, of the wing 154*b* adjacent to the attachment edge 158*b* may be greater than a thickness at the wing tip 159*a*. The reduction of thickness over a length of the wings 154*a* and 154*b* increases the flexibility of the wings 154*a* and 154*b* and also reduces the shearing force on the adhesive pad 170, which would tend to break the adhesive bond with the adhesive pad.

Figure 5G:
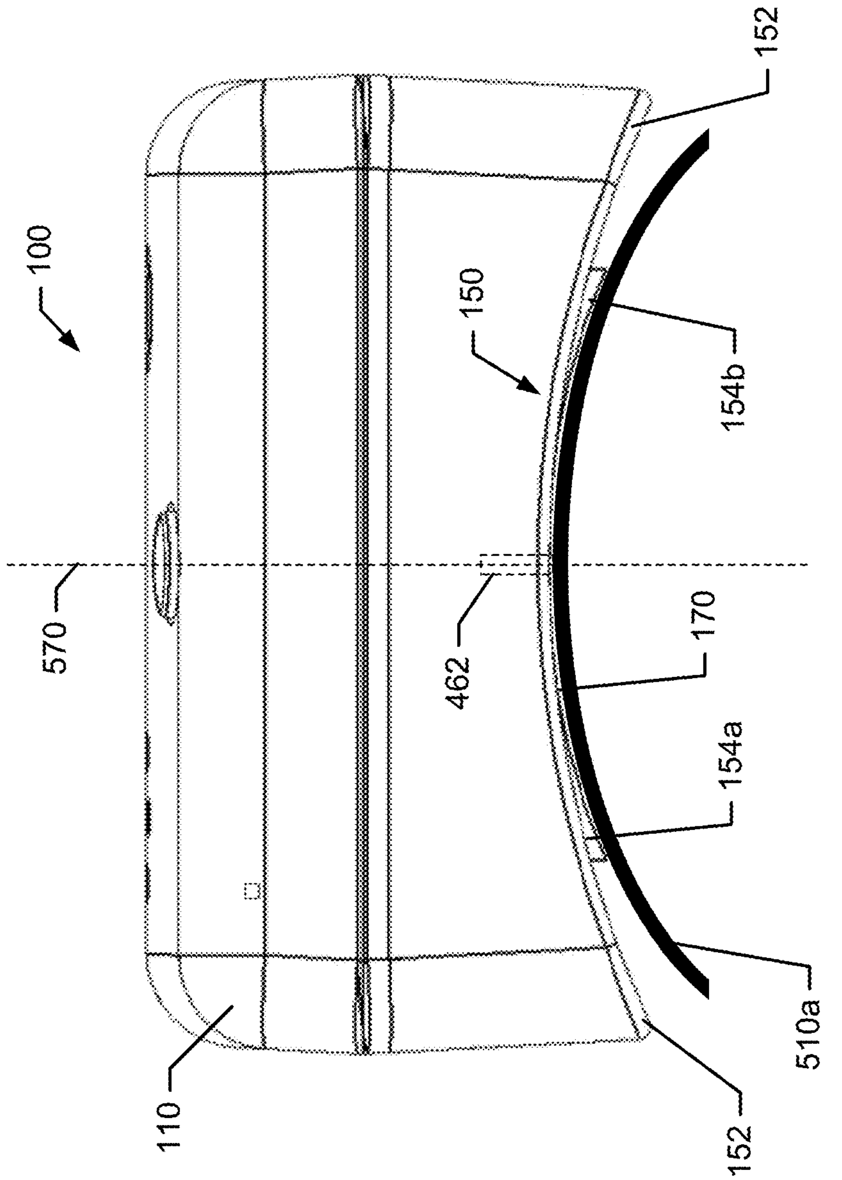
FIG. 5G illustrates a side view of the security device affixed to a curved surface of a product according to some example embodiments.

Referring to FIG. 5G, a side view of the security device 100 is shown with the engaging assembly 150 operably coupled to a curved product surface 510*a*. The surface 510*a* may have a curvature that is complementary to the curvature of the undeflected wings 154*a* and 154*b*. As such, with adhesive pad 170 disposed between the wings 154*a* and 154*b*, and the product surface 510*a*, the security device 100 may be affixed to the curved surface 510*a* of a product having a complementary curvature to the undeflected curvature 560 of the wings 154*a* and 154*b*, which may be a maximum curvature that the engaging assembly 150 may operably couple with.

Figure 5H:
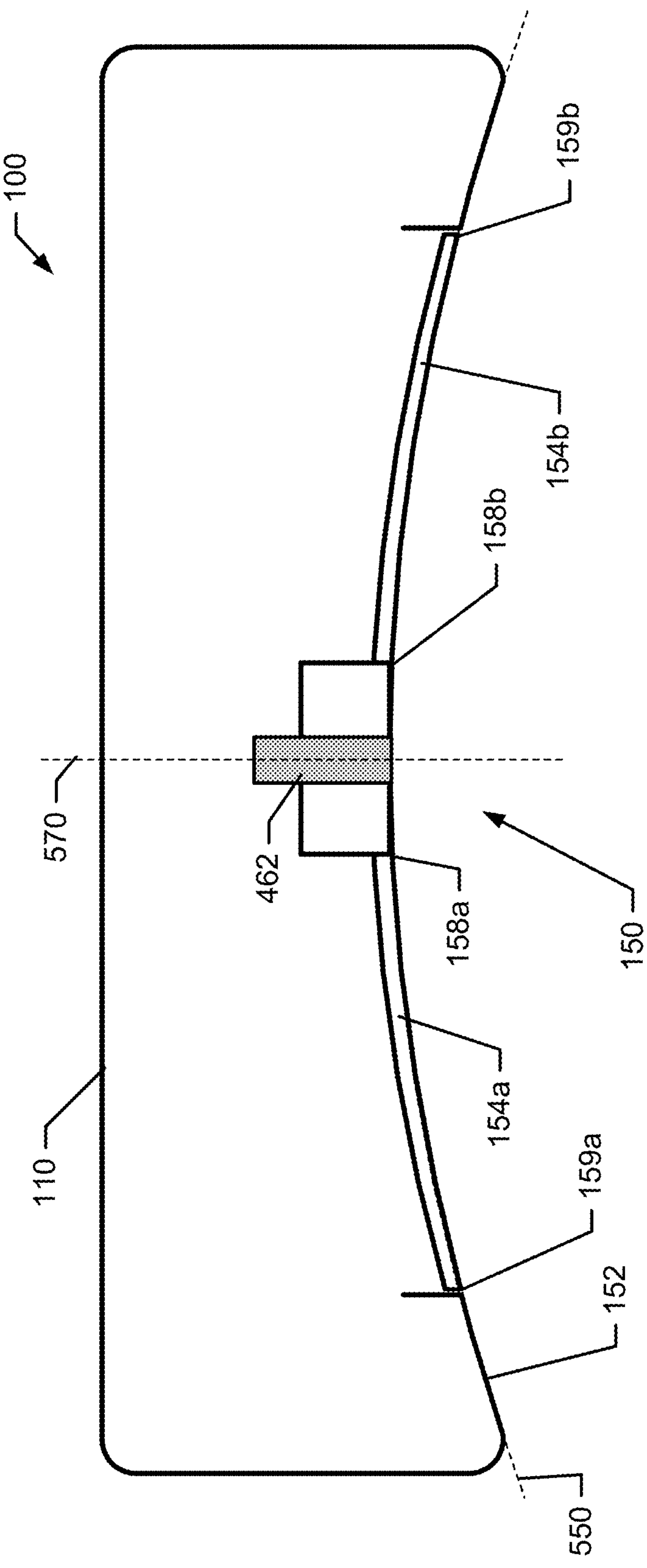
FIG. 5H illustrates a simplified cross-section view of the security device showing the engaging assembly with the flexible wings deflected according to some example embodiments.

Now referring to FIG. 5H, a cross-section view of the security device 100 that shows the relative positioning of the components of the engaging assembly 150 with the wings 154*a* and 154*b* in a fully deflected position is provided. In this regard, the wings 154*a* and 154*b* are positioned as if the wings 154*a* and 154*b* were in an operably coupled engagement with a curved product surface that has a curvature complementary to the curvature 550. Therefore, the wings 154*a* and 154*b* may be fully deflected and the plunger 462 may also be depressed as shown. The wing 154*a* has flexed about a pivot at the attachment edge 158*a* such that the wing tip 159*a* is aligned with the curved base 152. Similarly, the wing 154*b* has flexed about a pivot at the attachment edge 158*b* such that the wing tip 159*b* is aligned with the curved base 152. Accordingly, the configuration of the engaging assembly 150 as shown in FIG. 5H may be indicative of the engaging assembly 150 being in position for engagement with a product surface having a surface with a minimum curvature for the engaging assembly 150.

Figure 5I:
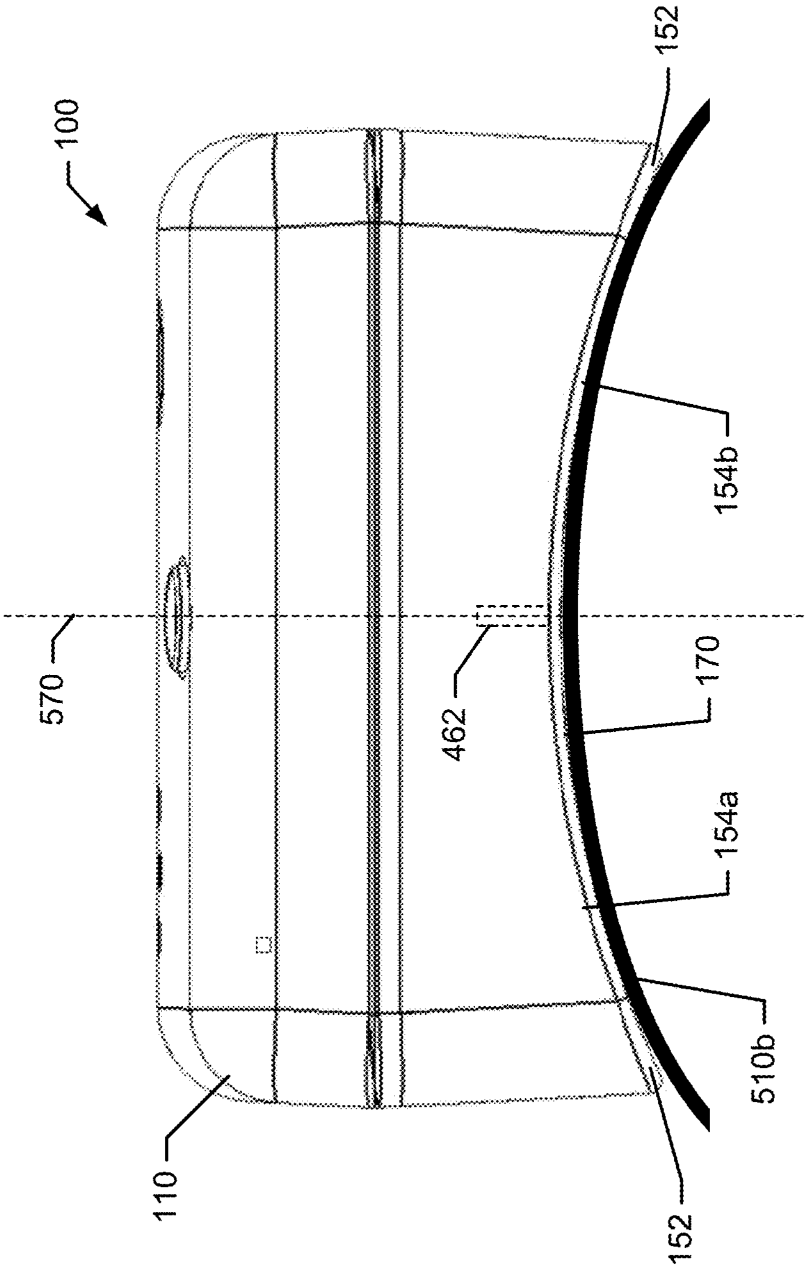
FIG. 5I illustrates a side view of the security device affixed to a curved surface of a product according to some example embodiments.

Referring to FIG. 5I, a side view of the security device 100 is shown with the engaging assembly 150 operably coupled to a curved product surface 510*b*. The surface 510*b* may have a curvature that is complementary to the curvature of the fully deflected wings 154*a* and 154*b* and the curvature of the curved base 152. As such, with adhesive pad 170 disposed between the wings 154*a* and 154*b*, and the product surface 510*b*, the security device 100 may be affixed to the curved surface 510*b* of a product having a complementary curvature to the curvature 550 of the curved base 152 and the fully deflected wings 154*a* and 154*b*, which may be a minimum curvature that the engaging assembly 150 may operably couple with.

Figure 6A:
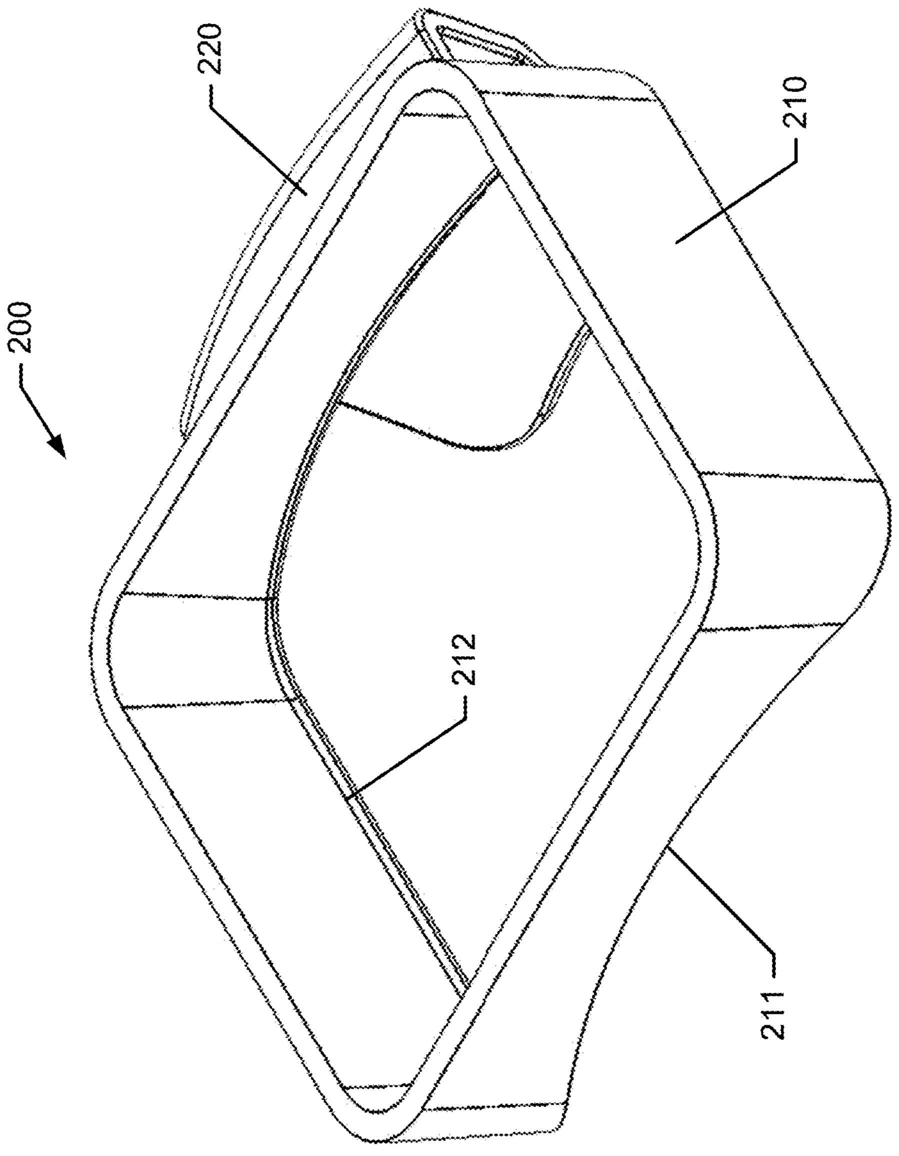
FIG. 6A illustrates a perspective view of a clip with a hook member according to some example embodiments.
Figure 6B:
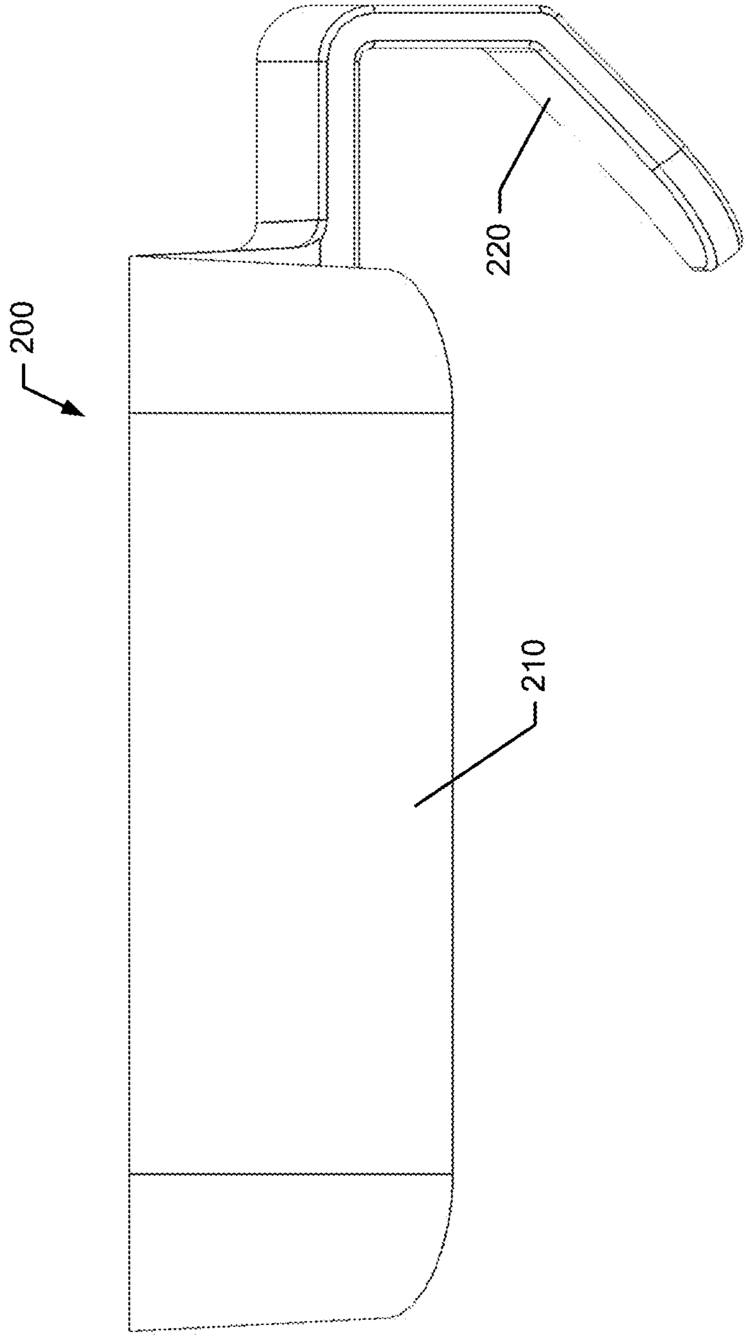
FIG. 6B illustrates a side view of a clip with a hook member according to some example embodiments.
Figure 6C:
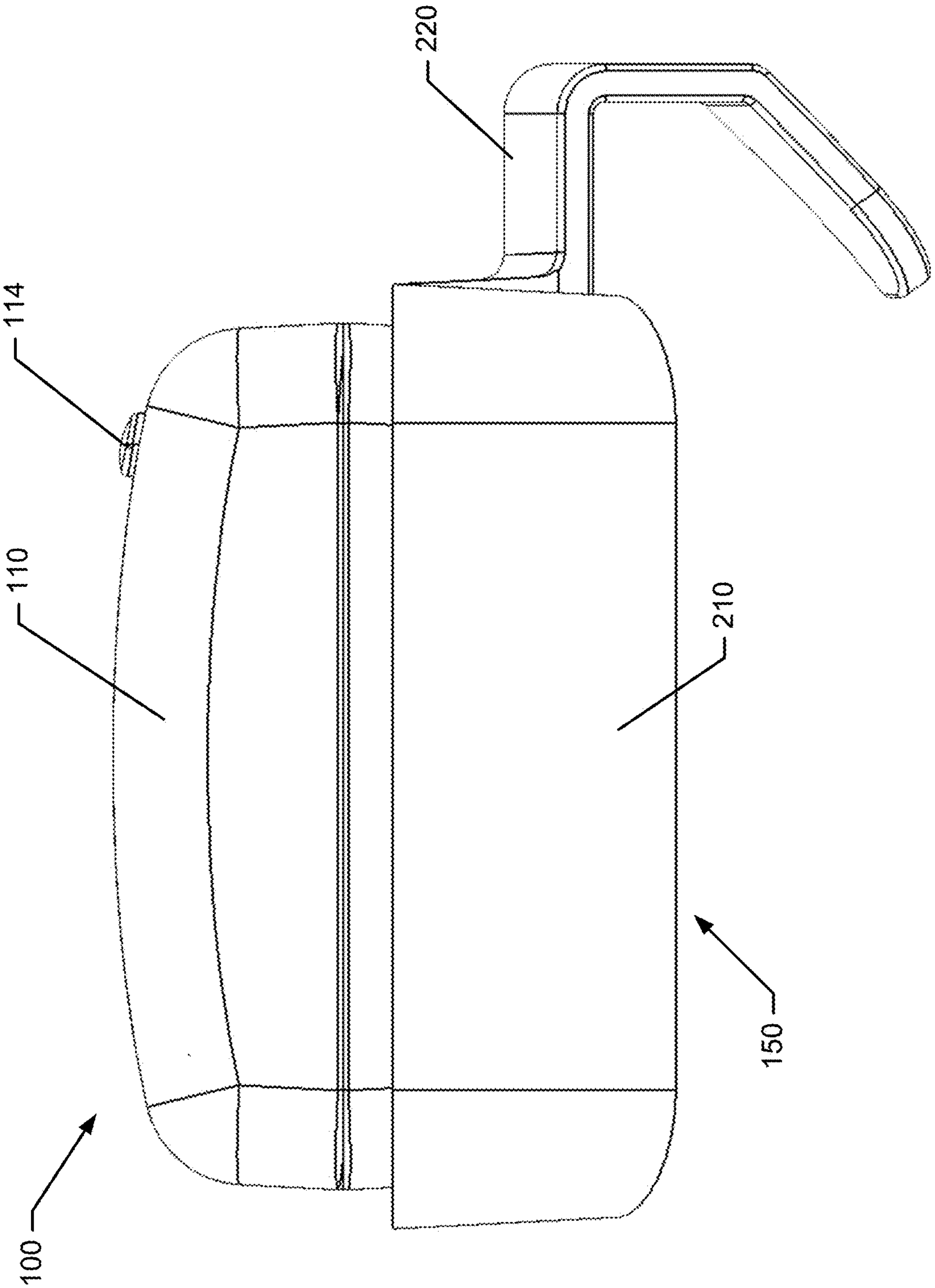
FIG. 6C illustrates a side view of a security device with a clip with a hook member attached according to some example embodiments.

As described briefly above, the security device 100 may be operably coupled to a clip 200 as shown in FIGS. 6A and 6B. The clip 200 may comprise a collar 210, an internal lip 212, and a hook member 220. The collar 210 may be configured to wrap around a product-facing end of the security device 100. Further, the collar 210 may comprise an internal lip 212 that may operate as a catch to prevent removal of the clip 200 when the clip 200 is coupled to the security device 100 and the security device 100 is affixed to a product. The collar 210 may also comprise an edge portion 211 that corresponds to the curvature of the curved base 152 to ensure that the collar 210 does not interfere with the engaging assembly 150's ability to engage with a product surface. Additionally, the hook member 220 may take a number of forms. According to some example embodiments, the hook member 220 may comprise an angled portion that forms an obtuse angle for an end of the hook member 220 to engage with differently positioned and differently shaped surfaces or openings. FIG. 6C shows a side view of the security device 100 in a coupled configuration with the clip 200.

Figure 7A:
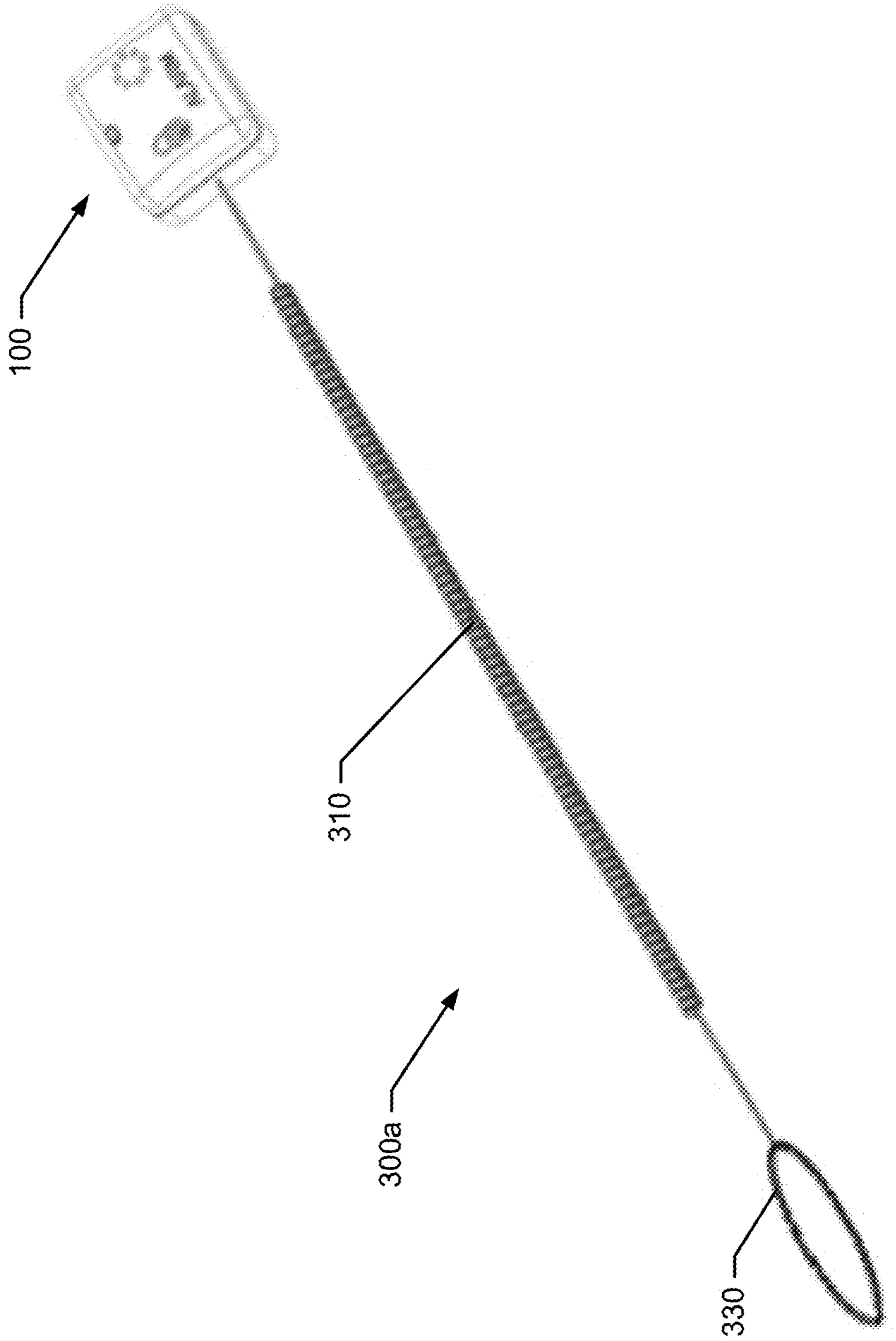
FIG. 7A illustrates a security device with a lanyard-type sensor device according to some example embodiments.
Figure 7B:
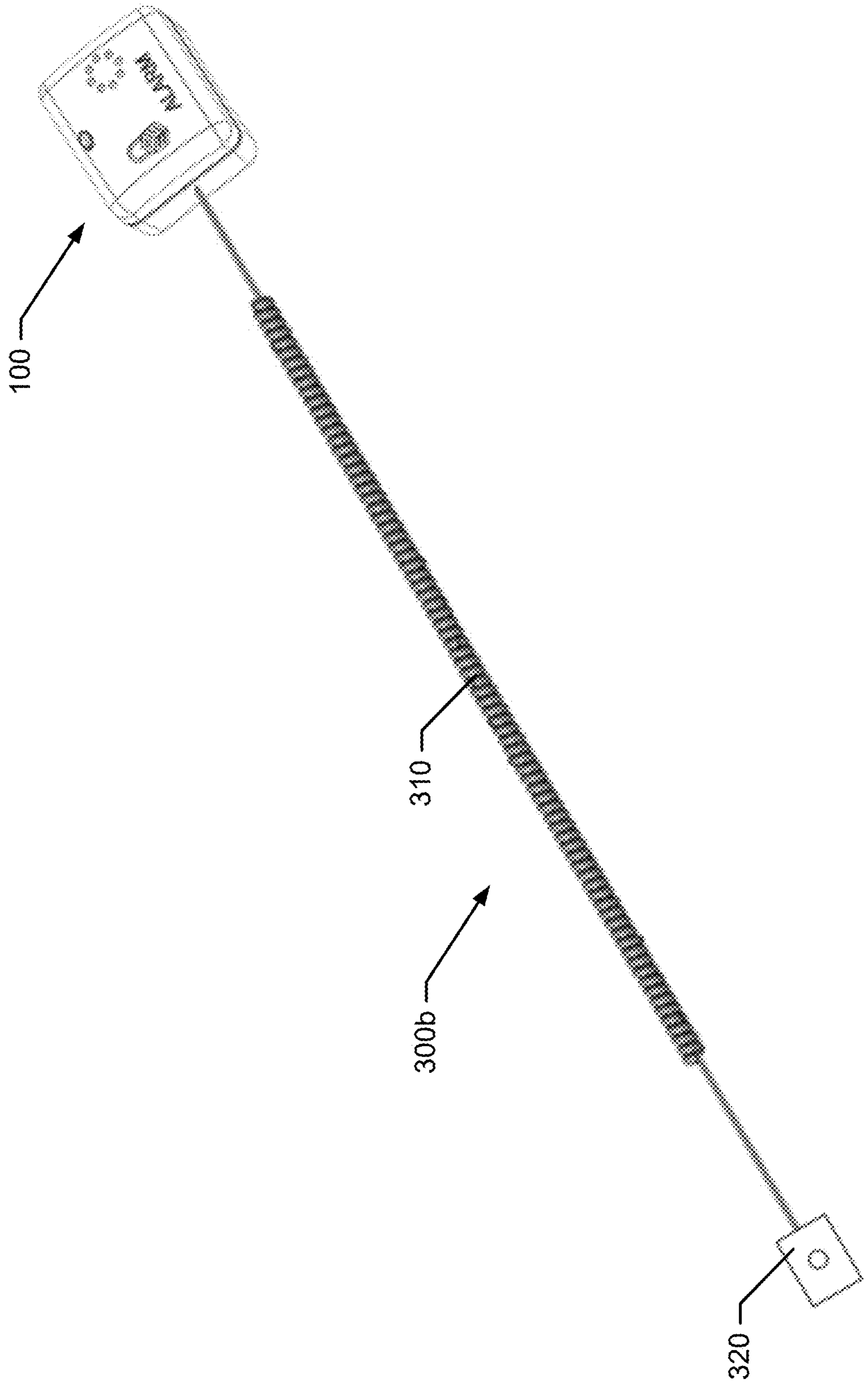
FIG. 7B illustrates a security device with a remote sensor device according to some example embodiments.

Referring now to FIGS. 7A and 7B, the security device 100 is shown coupled with a sensor device 300*a* and another sensor device 300*b*, respectively. In this regard, the sensor device 300*a* may be a lanyard-type sensor device that includes a loop 330 that can be wrapped around a product and the security device 100 may be pulled through the loop 330 to secure the sensor device around a product. Subsequently, the security device 100 may be affixed to the product or another related or accessory product while the loop remains coupled to the security device 100 via the tether 310. As described above, the security device 100 may sound an alarm in response to, for example, the loop 330 or tether 310 being severed and thereby creating an open circuit in the sense loop formed by the loop 330 and the tether 310, or removal of the security device 100 from a product surface.

The sensor device 300*b* may be a pressure sensor device that includes the remote sensor 320 which can be affixed, for example, via an adhesive pad, to a product and the security device 100 may be affixed to the same or another product. As described above, the security device 100 may sound an alarm in response to, for example, the remote sensor 320 being removed from a surface or tether 310 being severed. In each instance, according to some example embodiments, an open circuit may occur in a sense loop of the sensor device 300*b*, which may be detected by the security device 100 to cause an alarm to sound, as described above.

The embodiments presented herein are provided as examples and therefore the associated inventions are not to be limited to the specific embodiments disclosed. Modifications and other embodiments are intended to be included within the scope of the appended claims. Moreover, although the foregoing descriptions and the associated drawings describe example embodiments in the context of certain example combinations of elements and/or functions, different combinations of elements and/or functions may be used to form alternative embodiments. In this regard, for example, different combinations of elements and/or functions other than those explicitly described above are also contemplated. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments.

That which is claimed:

1. A security device comprising:

a housing comprising an engagement assembly configured to be operably coupled to a curved surface of a product; and a wireless signal generator disposed within the housing, the wireless signal generator being configured to output a wireless signal for detection by theft deterrence equipment;

wherein the engagement assembly comprises a curved base and a plurality of flexible wings;

wherein the plurality of flexible wings are configured to provide an adjustable coupling surface that flexes to conform to surfaces of products having different curvatures;

wherein the plurality of flexible wings comprises a first flexible wing:

wherein the first flexible wing is affixed to the security device at a pivot and extends away from the pivot to a first flexible wing tip:

wherein a thickness of the first flexible wing adjacent to the pivot is larger than a thickness of the first flexible wing at the first flexible wing tip.

2. The security device of claim 1, wherein the plurality of flexible wings protrude away from the curved base.

3. The security device of claim 1, wherein the plurality of flexible wings have a wing curvature that is different than a base curvature of the curved base.

4. The security device of claim 1, wherein the plurality of flexible wings are configured to flex inward, into alignment with the curved base.

5. The security device of claim 1, wherein a thickness of the first flexible wing from adjacent to the pivot to the first flexible wing tip continuously lessens.

6. The security device of claim 1 further comprising an adhesive pad configured to adhere to the plurality of flexible wings and the curved base on a first side of the adhesive pad and adhere to the curved surface of the product on a second side of the adhesive pad.

7. The security device of the claim 1 further comprising a hook member that extends away from the housing, the hook member being configured to be inserted into an aperture of an accessory product coupled to the product or rest on a surface of the accessory product.

8. The security device of the claim 7 further comprising a clip configured to operably couple to the engagement assembly such that the clip is secured between the engagement assembly and the curved surface of the product when the security device is affixed to the product;

wherein the clip comprises the hook member.

9. The security device of claim 1, wherein the plurality of flexible wings are bilaterally symmetric about a central plane.

10. A security device comprising:

a housing comprising an engagement assembly configured to be operably coupled to a curved surface of a product, the engagement assembly comprising a curved base and a plurality of flexible wings;

a plunger switch comprising a plunger, wherein the plunger switch provides an electrical output in response to the plunger being in a depressed position or an extended position, wherein the plunger is configured to contact the curved surface of the product when the security device is affixed to the product;

a sounder configured to controllably output an audible alarm sound; and processing circuitry configured to cause the sounder to emit the audible alarm sound in response to the electrical output from the plunger switch indicating that the plunger has moved from the depressed position to the extended position;

wherein the plurality of flexible wings are configured to provide an adjustable coupling surface that flexes to conform to surfaces of products having different curvatures;

wherein the plurality of flexible wings comprises a first flexible wing:

wherein the first flexible wing is affixed to the security device at a pivot and extends away from the pivot to a first flexible wing tip:

wherein a thickness of the first flexible wing adjacent to the pivot is larger than a thickness of the first flexible wing at the first flexible wing tip.

11. The security device of claim 10, wherein the plurality of flexible wings protrude away from the curved base.

12. The security device of claim 10, wherein the plurality of flexible wings have a wing curvature that is different than a base curvature of the curved base.

13. The security device of claim 10, wherein the plurality of flexible wings are configured to flex inward, into alignment with the curved base.

14. The security device of claim 10, wherein a thickness of the first flexible wing from adjacent to the pivot to the first flexible wing tip continuously lessens.

15. The security device of claim 10 further comprising an adhesive pad configured to adhere to the plurality of flexible wings and the curved base on a first side of the adhesive pad and adhere to the curved surface of the product on a second side of the adhesive pad.

16. The security device of the claim 10 further comprising a hook member that extends away from the housing, the hook member being configured to be inserted into an aperture of an accessory product coupled to the product or rest on a surface of the accessory product.

17. The security device of the claim 10 further comprising a tether wire that extends from the housing of the security device to be operably coupled to the product or another product;

wherein the processing circuitry is configured to cause the sounder to emit the audible alarm sound in response to the tether wire being severed.

18. The security device of claim 10, wherein the plurality of flexible wings are bilaterally symmetric about a central plane.

* * * * *